United States Patent
Kosugi

(12) 
(10) Patent No.: US 6,426,771 B1
(45) Date of Patent: Jul. 30, 2002

(54) IMAGE PROCESSING APPARATUS AND METHOD AND COMPUTER READABLE MEMORY STORING THE METHOD

(75) Inventor: Masato Kosugi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/897,551

(22) Filed: Jul. 21, 1997

(30) Foreign Application Priority Data

Jul. 19, 1996 (JP) .............................. 8-191196

(51) Int. Cl.[7] .............................. H04N 3/14; H04N 5/76; H04N 5/228
(52) U.S. Cl. ........................ 348/222; 348/232; 348/233; 348/279; 348/333.05; 345/555; 386/38; 386/117; 707/101; 707/200
(58) Field of Search ................................. 348/231, 232, 348/233, 390, 391, 396, 399, 405; 358/530; 345/530, 545, 546, 547, 549, 555; 386/1, 33, 34, 38, 109, 117; 707/100, 101, 200

(56) References Cited

U.S. PATENT DOCUMENTS

| | | | | |
|---|---|---|---|---|
| 5,034,804 A | * | 7/1991 | Sasaki et al. | 348/232 |
| 5,164,831 A | * | 11/1992 | Kuchta et al. | 358/209 |
| 5,396,343 A | * | 3/1995 | Hanselman | 358/426 |
| 5,528,293 A | * | 6/1996 | Watanabe | 348/231 |
| 5,576,759 A | * | 11/1996 | Kawamura et al. | 348/231 |
| 5,666,216 A | * | 9/1997 | Sugiura | 358/500 |
| 5,801,846 A | * | 9/1998 | Nobuta | 358/468 |
| 5,806,072 A | * | 9/1998 | Kuba et al. | 707/200 |
| 5,848,185 A | * | 12/1998 | Koga et al. | 382/173 |

* cited by examiner

Primary Examiner—Ngoc-Yen Vu
(74) Attorney, Agent, or Firm—Fitzpatrick, Cella, Harper & Scinto

(57) ABSTRACT

A color image signal input from a CCD or the like is processed to generate a color image signal containing a color subimage portion or a monochrome image signal containing a monochrome subimage portion and to record the image signals directly or after the image signals are JPEG compressed. For JPEG color recording, a color image signal supplied from a CCD and A/D converter is input to a selector, and to a 10/16 converting circuit and a first FIFO, and thereafter a color image and its color subimage are generated by a video processing circuit and compressed by a JPEG circuit, and output from a second FIFO and bus I/F to be recorded. For JPEG monochrome recording, an input color image signal is supplied to the 10/16 converting circuit and clamp circuit, multiplied at the first FIFO by a predetermined coefficient to generate a monochrome image containing a subimage. For RAW color or monochrome recording, JPEG compression is not performed.

18 Claims, 20 Drawing Sheets

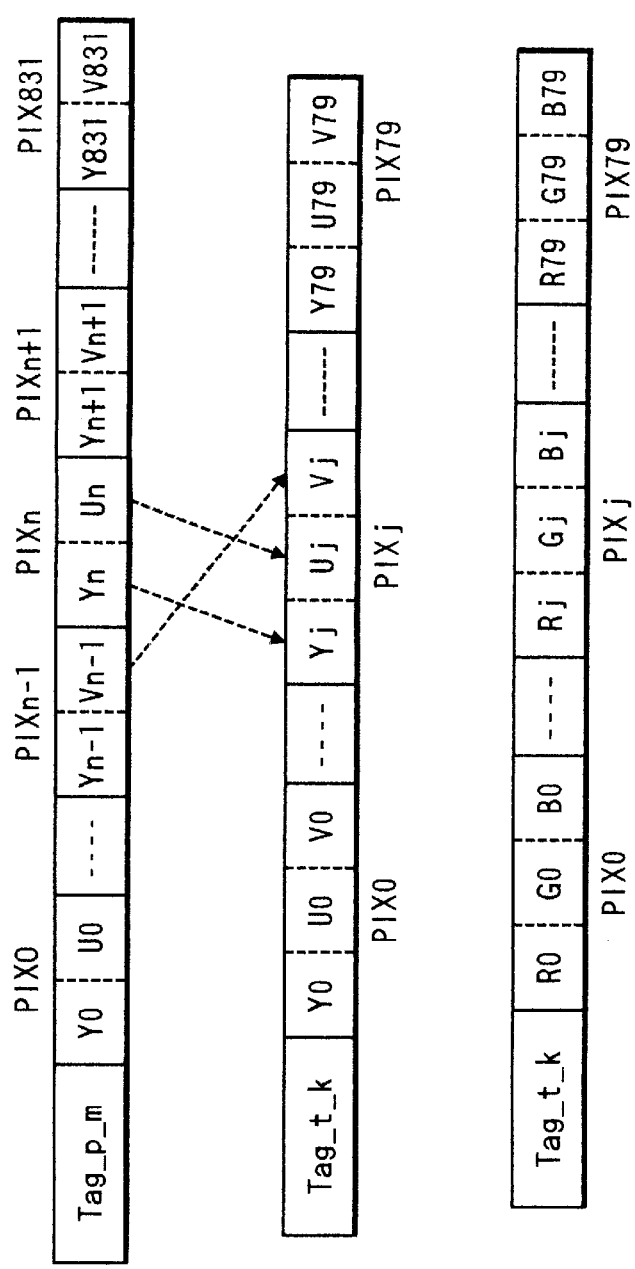

IMAGE PROCESSING APPARATUS AND METHOD AND COMPUTER READABLE MEMORY STORING THE METHOD

BACKGROUND OF THE INVENTION

1. Field of the Invention

The present invention relates to an image processing apparatus suitable for use with digital image processing apparatuses and the like, especially for use with digital cameras, to an image processing method, and to a computer readable memory storing the method as above.

2. Related Background Art

In taking an image with a conventional digital camera, the image projected on a CCD via an optical system is picked up as analog electrical signals and converted by an A/D converter into digital signals which are then processed by a DSP for gamma correction and other corrections and compressed by a compressor to record it in a storage unit.

When digital image data is to be stored, subimages called thumb-nail images are generally formed. If a user wants to overview photographed images, these thumb-nail images are reproduced without transferring and reproducing base image data. Although color image data is generally stored in general use, monochrome characters are sometimes stored. It has been proposed for this purpose to photograph characters at higher resolution by removing an optical low-pass filter in the optical system and processing monochrome character data.

However, when monochrome data processed by conventional techniques is compressed and stored according to JPEG, the image quality is degraded because of block distortion or the like inherent to JPEG processing.

Thumb-nail images are generally formed either in monochrome or color and the characteristics of an original base image are not correctly reflected upon. Therefore, if a base image is a composite image of color and monochrome, these color and monochrome of the base image cannot be discriminated from a corresponding thumb-nail image.

SUMMARY OF THE INVENTION

It is an object of the present invention to provide an image processing apparatus and method and a computer readable memory storing such a method, capable of easily confirming the characteristics of a base image.

It is an object of the present invention to provide an image processing apparatus and method and a computer readable memory storing such a method, capable of improving the quality of an index image called a thumb-nail image.

Under the above objects taken into consideration, a preferred embodiment of the invention discloses an image processing apparatus comprising: means for forming an image file and storing the image file in a storage medium; means for setting whether a color image file or a monochrome image file is formed from an input color image signal; and means for controlling the forming means to generate a reduced color image file or a reduced monochrome image file, in accordance with the setting by the setting means.

It is another object of the present invention to provide an image processing apparatus and method capable of converting image data composed of a base image and a subimage into another format.

It is still another object of the present invention to provide an image processing apparatus and method capable of readily converting an image taken with a digital camera into image data of another format.

It is a further object of the present invention to provide an image processing method and apparatus having a novel function.

The other objects and features of the present invention will become apparent from the following detailed description.

BRIEF DESCRIPTION OF THE DRAWINGS

FIGS. 12A, 12B and 12C are diagrams illustrating the concept of thumb-nail image processing.

DETAILED DESCRIPTION OF THE PREFERRED EMBODIMENTS

Figure 2:
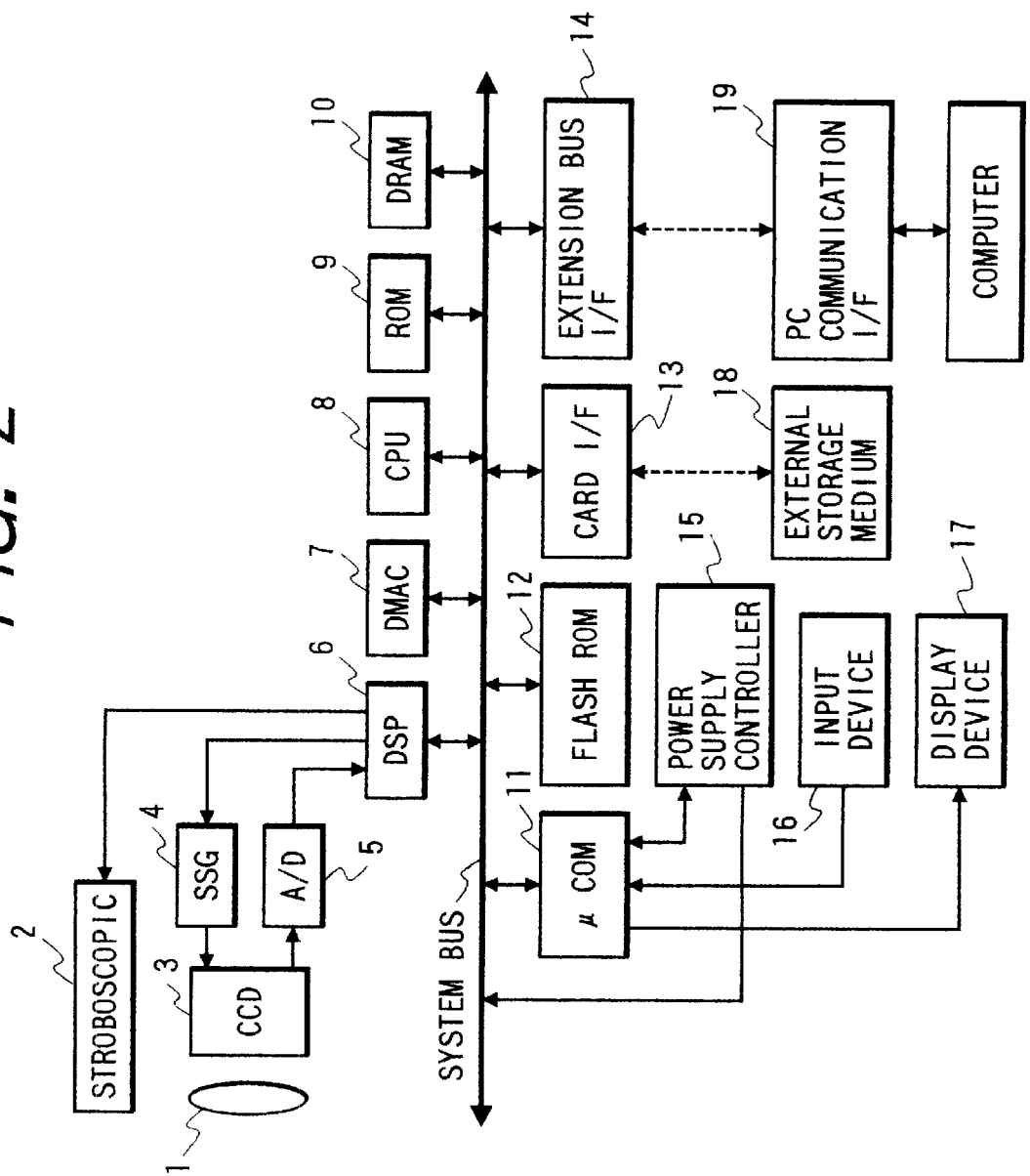
FIG. 2 is a block diagram showing a digital camera embodying the invention.

FIG. 2 is a block diagram of a digital camera to which the invention is applied. In FIG. 2, reference numeral 1 represents an optical unit including a lens, an aperture, a shutter, a quartz low-pass filter, and the like, reference numeral 2 represents an electronic flash, reference numeral 3 represents a CCD of a complementary color mosaic type, reference numeral 4 represents a synchronizing signal generator (SSG) for generating a timing signal and controlling CCD, reference numeral 5 represents an A/D converter for converting a CCD output into a 10-bit digital signal, reference numeral 6 represents a digital signal processor (DSP) for the control of the above-described image pickup elements and for the processing of digital signals, and reference numeral 7 represents a direct memory access controller (DMAC) capable of controlling two channels. Each channel is provided with a transfer originating address register, a transfer destinating address register, a transfer number register and a control register. Upon request from a device, data can be transferred to and from a memory through one bus access. Reference numeral 8 represents a CPU which has a local RAM and a local ROM of small scale and high speed, the latter storing an operating system of the digital camera. Reference numeral 9 represents a ROM for storing application programs of this camera system, and reference numeral 10 represents a DRAM for data storage of about 1 Mbyte.

Reference numeral 15 represents a power supply controller for controlling a battery and a power supply of this system, reference numeral 16 represents an input device such as a switch and a dial, reference numeral 17 represents a display device such as LED and LCD, reference numeral 11 represents a microcomputer with a sub-CPU for the collective management of the power supply controller 15 and user interfaces (UI) including the input device 16 and display device 17. Reference numeral 12 represents a rewritable non-volatile memory, flash ROM, for storing files such as image data. Reference numeral 18 represents an external storage unit such as a PC card, reference numeral 13 represents a card interface to the external storage unit 18, reference numeral 14 represents an extension bus interface for the extension of a system bus to the external, and reference numeral 19 represents a parallel interface such as Centronix and a PC communication interface with an external extension bus. The system bus is a separate bus of 16-bit data.

Figure 1:
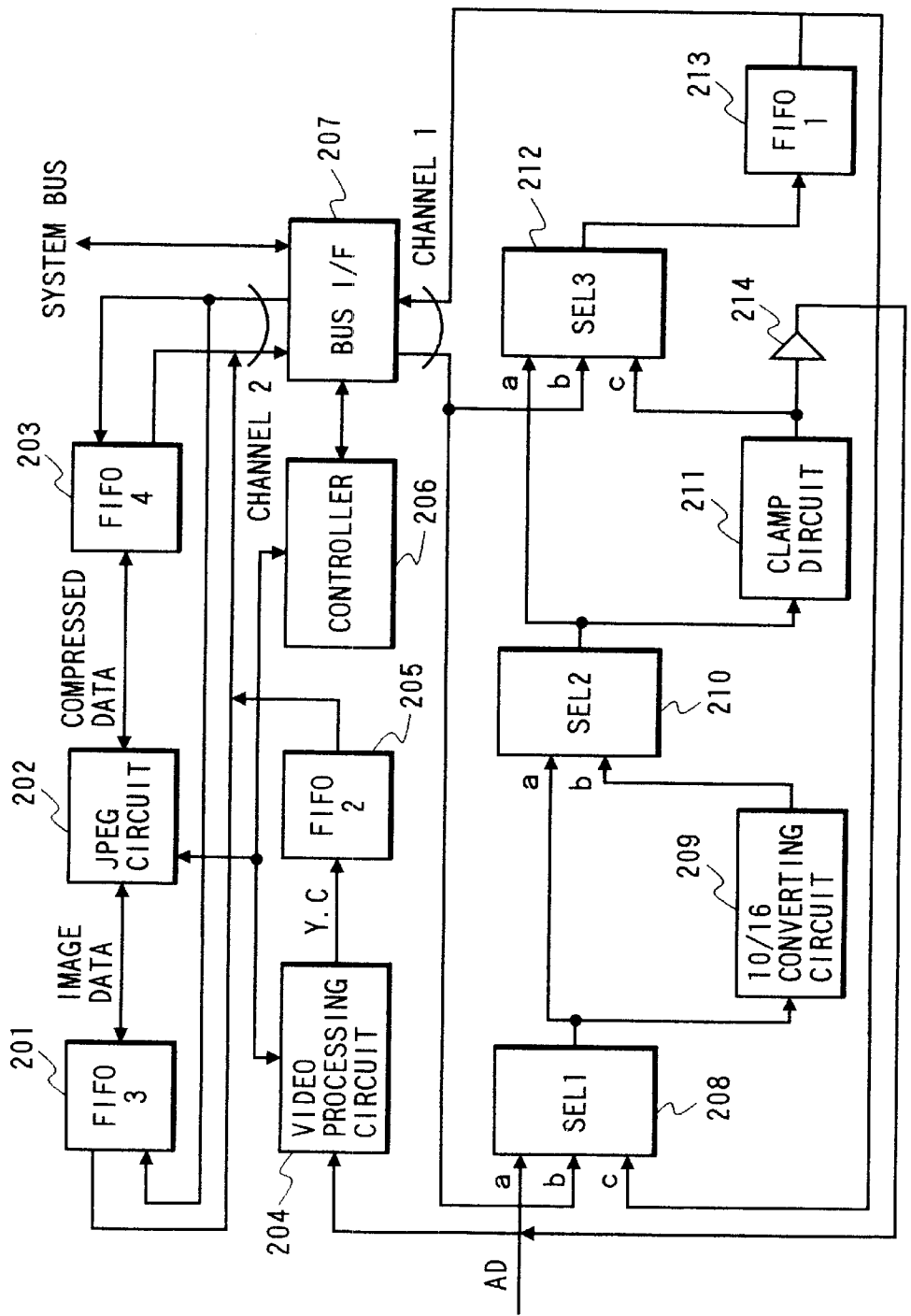
FIG. 1 is block diagram showing an embodiment of the invention.

FIG. 1 shows an internal circuit of DSP 6 of the embodiment shown in FIG. 2. In FIG. 1, reference numeral 202 represents a JPEG compression/expansion circuit which is a one-chip IC for the input/output of image data through block interleaving. Specifically, this circuit is constituted of a discrete cosine conversion (DCT) circuit, an inverse conversion circuit, a quantizing circuit, an inverse quantizing circuit, a Huffman encoding circuit, and a Huffman decoding circuit. Reference numeral 204 represents a digital video processing circuit commonly used for video cameras which is a one-chip IC for processing image data read from CCD through field addition. Specifically, this circuit is constituted of a 2H delay line circuit, a YC separation circuit, a color matrix circuit, an aperture correction circuit, a gain correction circuit, a gamma correction circuit, and the like, and generates digital video signals through filtering with three taps in the vertical direction and nineteen taps in the horizontal direction. Reference numeral 201 represents a bidirectional first-in-first-out memory (FIFO) for the data input/output to and from the JPEG circuit 202, and is constituted of 8-bit ×8-stage. Reference numeral 203 represents a bidirectional FIFO for the input/output of compressed data to and from the JPEG circuit 202, and is constituted of 16-bit× 8-stage. Reference numeral 205 represents a FIFO for the reception of data output from the video processing circuit 204, and is constituted of 16-bit×8-stage.

Reference numerals 208, 210 and 212 represent selectors (SEL1, SEL2 and SEL3) for selecting data buses. Reference numeral 209 represents a 10/16 converting circuit for converting (inverse-converting) a data bit width from 10 bits to 16 bits, and converts eight sets of 10-bit data into five words. Reference numeral 211 represents a clamp circuit for claiming data to a predetermined level. Reference numeral 213 represents a FIFO constituted of 16-bit×16-stage which includes a multiplier allowing a buffer to be multiplied by a predetermined coefficient. Reference numeral 214 represents a tri-state buffer for controlling an output of the clamp circuit 211. Reference numeral 206 represents a controller for the data communications with the JPEG circuit 202 and video processing circuit 204. This controller also controls the whole operation of DSP, and the other elements such as SSG 4 and flash 2. Reference numeral 207 represents an interface circuit with the system bus. Channels Nos. 1 and 2 are used for DMA. The data bus is basically 16 bits. Lower 10 bits are valid as the input of the video processing circuit 204, and lower 8 bits are valid as the input/output of the FIFO No. 3 201.

Next, the photographing and recording operation of this system will be described. In this system, the photographing mode can select either color or monochrome, and the recording mode can select either JPEG or RAW. The pixel size can be switched between three steps (832×608, 640× 480, 320×240). For the selection of the photographing mode, a user manually operates a turnover switch of the input device 16 for switching between color and monochrome. For the selection of the recording mode and pixel size, a user operates a dial switch SW of the input device 16. In any mode, a thumb-nail image of an original image is generated by thinning pixels of the original image by about 1/100. The photographing and recording operation in each mode will be described hereinafter.

(Color photographing JPEG recording)

When a user depresses a release switch SW of the input device 16, the microcomputer 11 wakes up from its sleep mode. This release switch SW has two switches SW1 and SW2. The microcomputer 11 instructs the power supply controller 15 to turn on the system power supply. After a predetermined time lapse after the power supply controller 15 operated to supply power, a reset signal to CPU 8 is released. As the reset state is released, this CPU 8 wakes up and executes a wake-up sequence stored in the built-in ROM and ROM 9. During the wake-up sequence, various operations are executed such as initialization of devices and waking-up of respective services. After the completion of the wake-up sequence, CPU 8 operates as a master to communicate with the microcomputer 11 so that the depression of SW1 is detected and a corresponding event is issued to an event manager. The event manager checks other operation states, and if photographing is possible, a photographing preparation event is issued so that a procedure corresponding to this event, i.e., a photographing preparation procedure is issued.

The photographing and recording sequence is constituted of the photographing preparation procedure and an actual photographing exposure procedure. Executed during the photographing procedure are a power turn-on of a photographing optical system, an AF control, an AE control, an AWB control and a generation of a memory configuration for the storage of CCD data. Executed during the actual photographing exposure procedure are an exposure, a CCD data transfer, a signal processing and recording and the like which are carried out in a predetermined sequential order.

For the AF, AE and AWB controls during the photographing preparation procedure, the video processing circuit 204 evaluates CCD data. Specifically, the controller 206 operates to open the output of FIFO No. 1 213, to input an output of the A/D converter 5 to the video processing circuit 204, and to set a field addition read mode of CCD 3 via SSG 4. The controller 206 also operates through communications with the video processing circuit 204 to set a process mode and a data evaluation area to the video processing circuit 204 and to fetch an evaluation value.

Figure 3:
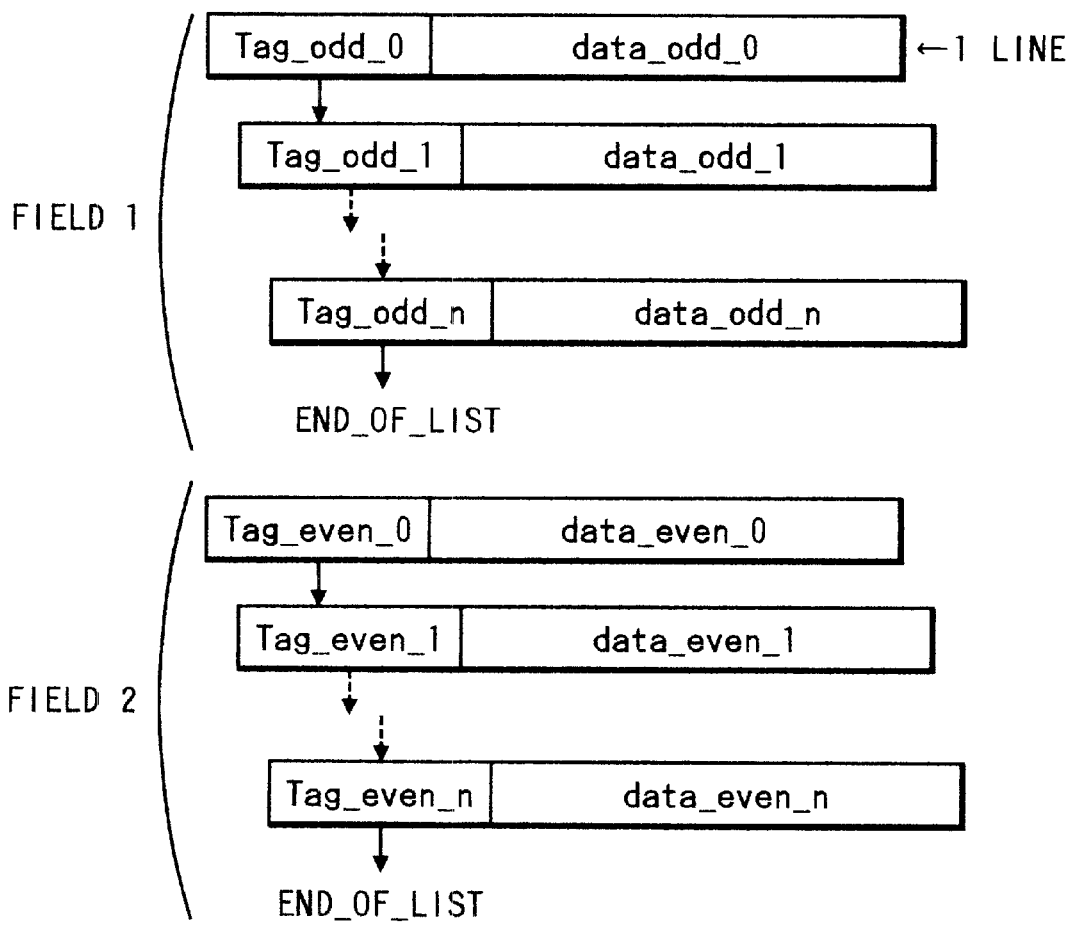
FIG. 3 is a diagram showing the memory structure of a CCD list.

An area for storing CCD data is two unidirectional linked lists formed on DRAM 10. The memory structures of the lists are shown in FIG. 3. A memory area for one line of CCD data is one linear memory block and is constituted of a tag field and a data field. The tag field stores a reference pointer to the next line. For example, Tag odd 0 stores an address of Tag odd 1. The data field is an area for storing one line of CCD data. One linked list is formed by n lines which correspond to one field memory area. All pixel data of CCD can be stored in two fields. END OF LIST as the reference point to TAG odd n or TAG even n is set to −1. A linear memory area of each line is managed by a memory manager. However, each line is a relatively small memory block and can be stored arbitrarily on DRAM 10. Therefore, the memory area can be used efficiently. These two unidirectional linked lists are hereinafter called a CCD list. This CCD list is formed during the photographing preparation procedure.

After the completion of the photographing preparation procedure, a photographing preparation completion event is issued to the event manager. The event manager checks the operation history of SW2 and other operation states, and if exposure is possible, an actual exposure event is issued so that the actual photographing exposure procedure corresponding to this event is executed. During the actual photographing exposure procedure, CCD 3 is switched to an exposure mode and the shutter is depressed. As CCD data is transferred, it is A/D converted and image data of one frame is DMA transferred to DRAM 10.

The DMA transfer of CCD data will be described hereinafter.

During the actual exposure, the controller operates to set SEL No. 1 208 to a contact a, SEL No. 2 210 to a contact b and SEL No. 3 212 to a contact a, to open the output of the buffer 214, to set the channel No. 1 as an output, and to disable a multiplication function of FIFO No. 1 213. Therefore, a signal path is established from the A/D converter 5, 10/16 converting circuit 209, SEL No. 2 210, SEL No. 3 212, FIFO No. 1 213, and to bus interface 207. CCD 3 is set to a frame read mode. Thereafter, CCD is controlled via SSG 4 to execute exposure.

After this actual exposure, an interrupt inhibition is set, and thereafter CCD data is DMA transferred to the CCD list during a two-field period. During the DMA transfer, the program refers to data odd 0 by referring to Tag odd 0, and supplies DMAC 7 with a data odd 0 pointer as a transfer destinating address of channel No. 1, with a 1H data number as a transfer number, and with a device-to-memory direction as a transfer direction. The controller 206 operates to make CCD data to be read. This CCD data is converted by the A/D converter 5 into 10-bit digital data which is converted by the 10/16 converting circuit 209 into 16-bit width digital data, i.e., through conversion of 10-bit data into five words and input to FIFO No. 1 213.

The controller 206 enables the data read by FIFO No. 1 213 at a timing when CCD data becomes valid pixel data, and issues a DMA request of the channel No. 1 to DMAC 7. Upon reception of this channel No. 1 DMA request, DMAC 7 performs a burst DMA transfer from FIFO No. 1 213 for the data odd 0 in accordance with a predetermined protocol, while incrementing the transfer destinating address. After 1H DMA transfer is completed, the program refers to Tag odd 1 by referring to Tag odd 0, and further refers to data odd 1 to supply DMAC 7 with a data odd 1 pointer as the channel No. 1 transfer destinating address and a transfer number as the 1H data number.

Since garbage data is accumulated in FIFO No. 1 213, the controller 206 refreshes it and again enables data read from FIFO No. 1 213 at a timing when CCD data becomes valid pixel data, and also issues a DMA request of the channel No. 1 to DMAC 7. In the similar manner thereafter, data up to data odd n is transferred to complete the data transfer of the field No. 1. During the DMA transfer of the field No. 2, Tag even 0 is referred to supply DMAC 7 with a data even n pointer as the channel No. 1 transfer destinating address to thereby execute the data transfer in the manner similar to the field No. 1. After the DMA transfer for two fields is completed, the interrupt inhibition is released.

In this embodiment, data is read starting from the odd field. However, depending upon the timing of actual exposure, data may be read starting from the even field. In this case, DMA transfer is executed in the order of field No. 2 and field No. 1.

Figure 4:
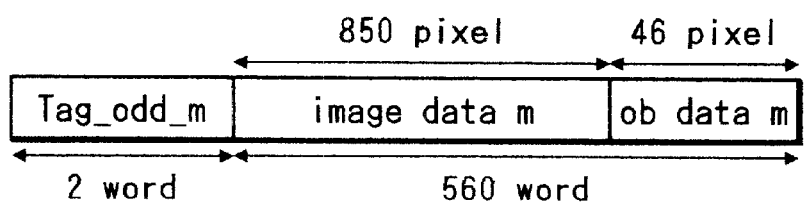
FIG. 4 is a diagram showing the contents of data after DMA transfer.

FIG. 4 shows an example of a memory block of one line after the DMA transfer. Data odd m includes image data of 850 pixels and optical black (OB) data of 46 pixels. The OB data is used later for the digital clamp. Since the 10/16 conversion is carried out, the data amount is 1124 bytes including the tag field. In this embodiment, one field is made of 307 lines so that the total data amount is 1124×307×2= 690136 bytes which can be stored in a DRAM memory having a capacity of 1 Mbyte.

Figure 5:
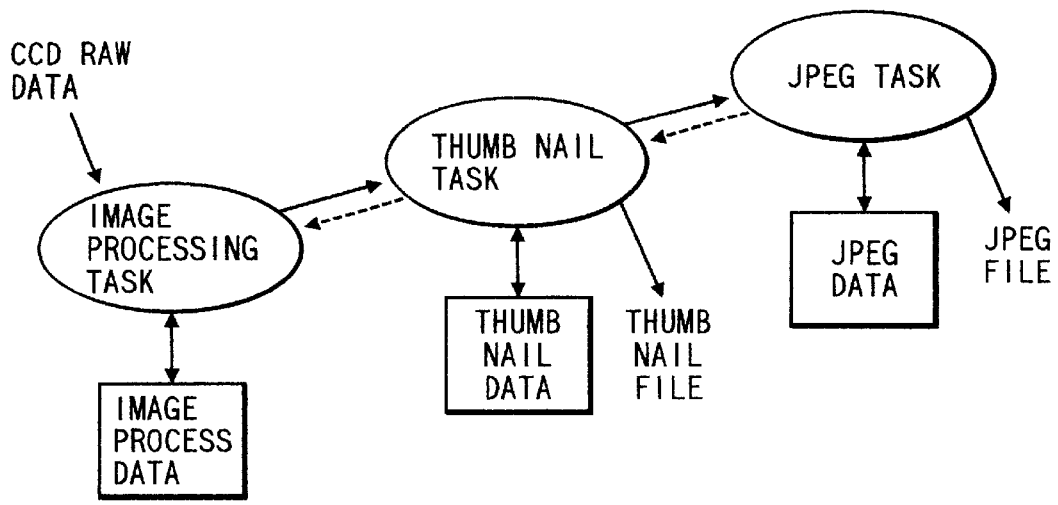
FIG. 5 is a diagram illustrating the concept of a signal processing task.

After the DMA transfer of CCD data, a signal processing and recording sequence is performed. During this signal processing and recording sequence, three tasks are executed in parallel, including a color image processing task, a thumb-nail task and a JPEG task. FIG. 5 is a diagram illustrating the concept of these tasks. In FIG. 5, a data flow is indicated by a solid line arrow, and a control flow is indicated by a broken line arrow. During the signal processing and recording sequence, all processes are executed by using the JPEG task as a master. Namely, when the JPEG task issues a data request to the thumb-nail task, the thumb-nail task suspends the data request and issues a new data request to the image processing task.

The image processing task performs a data process satisfying the request issued by the thumb-nail task, and after the completion of this data process, it responds to the thumb-nail task. Thereafter, the thumb-nail task thins processed image data to generate thumb-nail data and thereafter responds to the JPEG task. Upon reception of this response, the JPEG task performs a JPEG process for the processed data to generate JPEG data, and if necessary, forms a JPEG file. The above process is controlled in the unit of line. When all lines are processed, the thumb-nail task forms a thumb-nail file to terminate the signal processing and recording sequence.

Next, each image processing will be described.
(Color image processing)

Figure 6:
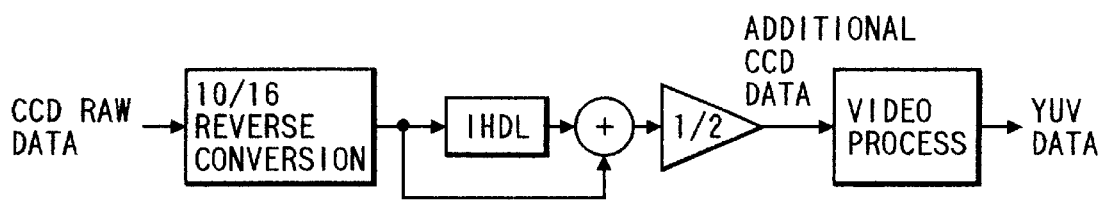
FIG. 6 is a diagram illustrating the concept of color image processing.

FIG. 6 is a diagram showing the concept of color image processing. In this color image processing, CCD RAW data 10/16 converted and DMA transferred, i.e., a CCD list is 10/16 inverse-converted and an addition average is obtained by using the 1H delay line, so that a vertical addition mixing of frame-read CCD data is obtained. The obtained data is hereinafter called addition CCD data. This addition CCD data is processed by the video processing circuit 204 to generate YUV data which becomes processed image data. The first half of the color image processing for generating the addition CCD data is hereinafter called a vertical addition mixing process, and the second half for generating YUV data from the addition CCD data is hereinafter called a video process. In this embodiment, the vertical addition mixing process is executed by software, whereas the video process is executed by hardware.

Figure 7:
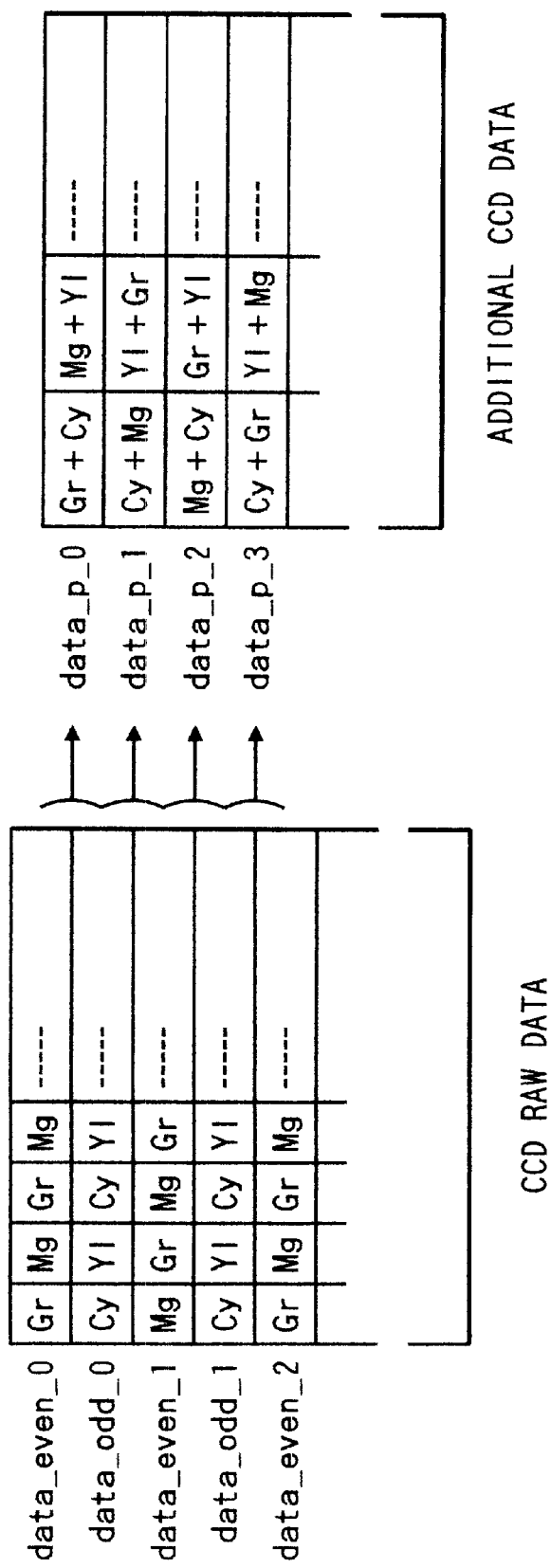
FIG. 7 is a diagram illustrating the concept of vertical addition and mixing.
Figure 9:
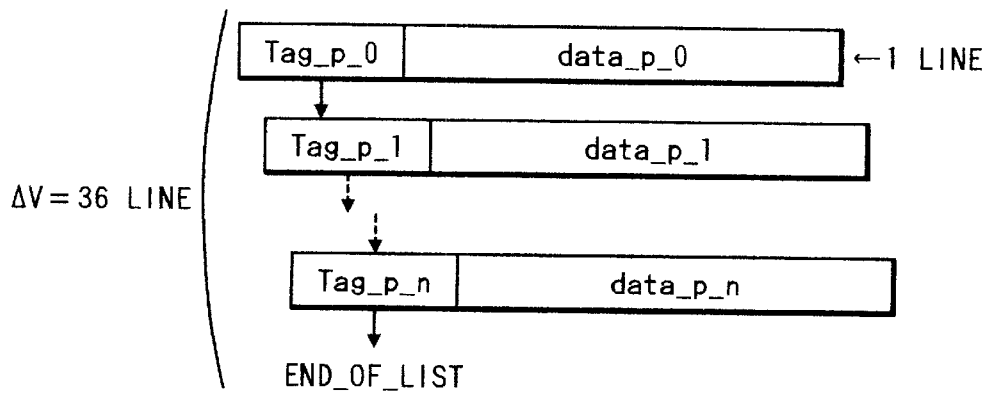
FIG. 9 is a diagram showing the memory structure of a list used by color image processing.

Used in the vertical addition mixing process is a processed image unidirectional linked list shown in FIG. 9. The memory structure is the same as the CCD list. In this embodiment, 36 lines are used which are developed on DRAM 10. FIG. 7 is a diagram illustrating the concept of the vertical addition mixing process. In FIG. 7, CCD RAW data shown on the left side corresponds to a CCD list, and the addition data on the right side corresponds to a processed color image list. The actual CCD list is subjected to 10/16 conversion. In FIG. 7, Gr (green), Mg (magenta), Cy (cyan) and Yl (yellow) represent optical color filters which are disposed in a complementary color mosaic layout. In this example shown in FIG. 7, data even 0 is shown geometrically at the higher position than data odd 0 on the CCD optical system. For the raster process of the CCD list shown in FIG. 7, the 1H delay line is used to obtain an addition average of preceding and succeeding lines. Therefore, for example, vertical addition mixing of data even 0 and data odd 0 can be performed to generate data p 0. In this manner, data p 1, data p 2, . . . can also be generated.

Figure 10:
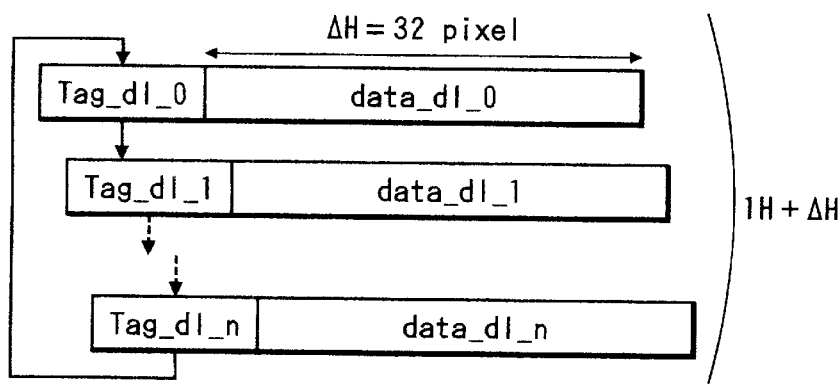
FIG. 10 is a diagram showing the memory structure of a 1H delay line.

The details of the vertical addition mixing will be given hereinafter. In this embodiment, the 1H delay line is realized by using a ring buffer shown in FIG. 10. High speed operation of the 1H delay line is required so that it is formed on a local memory of CPU 8. The data area (ΔH) of each list has 32 pixels. In this embodiment, in order to configure a delay line of 850 pixels, 28 lists (e.g., 1H+ΔH=896 pixels) are used. Upon reception of a data request from the thumbnail task, the color image processing task performs 10/16 inverse conversion of data even 0 of the CCD list by using software, starting from the top of the data even 0 in the order from data dl 0 to data dl 1, and fills the data of every 32 pixels. After the completion of filling data even 0, the memory block of the Tag even 0 is released. In this state, the 1H delay line is filled up to the data dl 26 and the field of data dl 27 only is empty.

Next, the data p 0 memory block is secured to perform 10/16 inverse conversion of first 20 words from the top of data odd 0 into 32 pixels which are filled in the data dl 27. An addition average with the next list data dl 0 is obtained one pixel after another to fill the results from the top of data p 0. Thereafter in the similar manner, after the process for data odd 0 is completed, the Tag odd 0 memory block is released, and the data of one line after the addition mixing process is filled in data p 0.

Then, the data p 1 memory block is secured to couple to the Tag p 0 list. Next, the data p 1 is obtained by referring to the Tag even 1 and the data even 1 is further referred to to obtain the original input data and perform the processes similar to the above. In this manner, the vertical addition mixing process for all image processing lists is completed. Use of the 1H delay line allows the vertical addition mixing process to be executed with a smaller memory capacity and without degrading the process performance. Since releasing the CCD list and generating the image processing list are performed sequentially for each line, these processes can be executed smoothly without giving too much load on the memory.

Next, the video process is performed for the processed image list. With this video process, YUV data of 32 lines is generated from addition data of 36 lines. First, in the diagram shown in FIG. 1, the output of FIFO No. 2 205 is allocated to the channel No. 2, the input thereof is allocated to the channel No. 1, SEL 3 212 is set to a contact to b, SEL No. 1 203 is set to a contact c, SEL No. 2 210 is set to a contact a, an output of the tri-state buffer 214 is enabled, and the output of the A/D converter 5 is opened. Therefore, a data path can be established from the bus interface 207, channel No. 1, FIFO No. 1 213, clamp circuit 211, video processing circuit 204, FIFO No. 2 205, channel No. 2, and to bus interface 207. The multiplication function of FIFO No. 1 213 is disabled and the clamp circuit 211 is set beforehand with an average of OB of several tens lines.

Figure 8A:
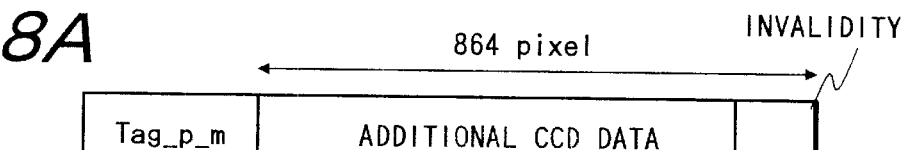
FIGS. 8A, 8B, 8C, 8D and 8E are diagrams illustrating the concept of video processing.

FIGS. 8A to 8E are diagrams illustrating the concept of the video process. The video process will be described with reference to these diagrams. FIG. 8A shows an example of the processed image list after the virtual addition mixing process. The vertical addition mixing process is performed relative to 864 pixels per one line. However, since the last 14 pixels are OB data and invalid, the real image data is 850 pixels. The video process is performed twice for each line, because the video processing circuit 204 cannot deal with about 600 pixels during each horizontal period. First, in DMAC 7, the transfer direction of the channel No. 1 is set to a direction from a memory to a device, the transfer direction of the channel No. 2 is set to a direction from a device to a memory, the transfer originating point of the channel No. 1 is set to Pa shown in FIG. 8B, the transfer destinating point of the channel No. 2 is set to Pa, the transfer number of the channel No. 1 is set to Ls (434 pixels), and the transfer number of the channel No. 2 is set to Ld (416 pixels).

The controller 206 issues a DMA request for the channel No. 1 to DMAC 7. Upon reception of this DMA request, DMAC 7 burst-transfers the addition CCD data to FIFO No. 1 213 while incrementing the transfer originating address. The DMA transferred addition CCD data is properly output from FIFO No. 1 213, level-shifted by the clamp circuit 211 to a predetermined level, and input to the video processing circuit 204. In the video processing circuit 204, the input data is processed with a delay of about 50 pixels and supplied to FIFO No. 2 205. As FIFO No. 2 205 becomes nonempty, the controller 206 issues a DMA request for the channel No. 2 to DMAC 7.

Upon reception of the DMA request for the channel No. 2, DMAC 7 burst-DMA transfers YUV data output from FIFO No. 2 205 sequentially starting from Pa while incrementing the transfer destinating address. In this case, since there are two DMA requests to DMAC 7, DMAC 7 executes the burst DMA transfer alternately between the channels Nos. 1 and 2 for each transfer. After the completion of the two DMA transfers, YUV data of 416 pixels such as shown in FIG. 8C is generated in the processed image list on the same line. At this time, the video processing circuit 204 has a delay of about 50 pixels so that the transfer destinating address of the channel No. 2 will not exceed the transfer destinating address of the channel No. 1.

Figure 8B:
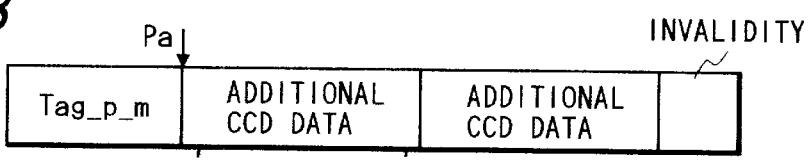
Figure 8C:
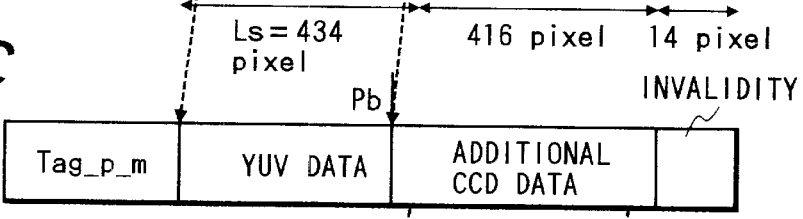
Figure 8D:
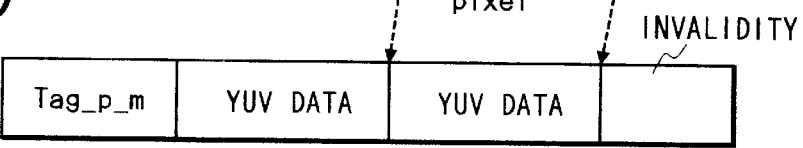
Figure 8E:
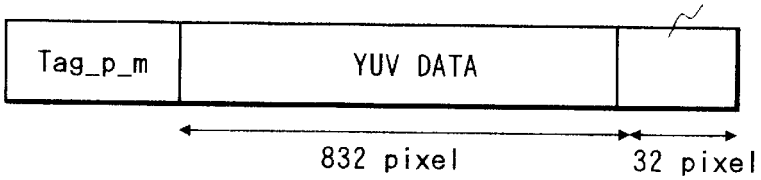

The first nine pixels and last nine pixels of the addition data shown in FIG. 8B are made invalid because these pixel data are imperfect due to the filtering at the video processing circuit 204. Most of the data during the DRAM transfer of the two channels are accessed to the same page of DRAM if the access timings are almost the same, thereby realizing high speed processing. Next, in DMAC 7, the transfer originating point of the channel No. 1 is set to Pb shown in FIG. 8C, the transfer destinating point of the channel No. 2 is set to Pb, the transfer number of the channel No. 1 is set to Ls (434 pixels), the transfer number of the channel No. 2 is set to Ld (416 pixels) to thereafter generate the second half YUV data shown in FIG. 8D. In the above manner, YUV data of one line having 832 pixels shown in FIG. 8E is generated.

The video processing circuit 204 performs a field process and has a delay of 2H in the vertical direction. Therefore, for the actual generation of YUV data of 32 lines, the video process is required to be executed in the order of: the first half of data p 0, the first half of data p 2, . . . , the first half of data p 34, the second half of data p 0, the second half of data p 2, . . . , the second half of data p 34, an insertion of a dummy line of 1H, the first half of data p 1, the first half of data p 3, . . . , the first half of data p 35, the second half of data p 1, the second half of data p 3, . . . , and the second half of data p 35. As seen from FIG. 7, the addition CCD data structure is shifted by just 1H between the even addition field such as data p 0 and p 2 and the odd addition field such as data p 1 and data p 3. This is the reason why 1H dummy line is inserted. By inserting this dummy line between the processed even image list and processed odd image list, both the even and odd addition field data can be processed at the same field of the video processing circuit 204.

Data p 0 to data p 3 become invalid YUV data because these pixel data are imperfect due to the vertical direction processing at the video processing circuit 204. It is therefore unnecessary for data p 0 to data p 3 to execute the DMA transfer of the channel No. 2. The generated YUV data shown in FIG. 8E is more correctly YUV data corresponding to the addition data before one line. The addition CCD data at the last four lines of data p 32 to data p 35 can be used for the video process of the next block. Therefore, immediately before the addition CCD data is changed to the YUV data, it is copied to data p 0 to data p 3.

With the above processes, the YUV data valid for the last 32 lines of the processed image list can be generated. The color image processing task responds to the data request from the thumb-nail task by returning information of Y, U and V image constituent data back to it to allow the thumb-nail task to start operating. The image constituent information is, for example, the number of lines, the number of pixels per line, the number of dots per pixel, a pointer to the start of a line block, and a data interval.

If the image size is 640×480 pixels, Pa shown in FIG. 8B is shifted back by 96 pixels, Ls is set to 338 pixels, and Ld is set to 320 pixels. If the image size is 320×240 pixels, Pa shown in FIG. 8B is shifted back by 96 pixels, Ls is set to 338 pixels, and Ld is set to 320 pixels, and in addition the odd field addition shown in FIG. 7 is not carried out but only the even addition data is used for the field data process to generate the processed image data of 640×240 pixels. Then, the data interval in the horizontal direction used as the above-described return information is doubled to supply an upper level task with the data of 320×240.

(Thumb-nail process)

Figure 11:
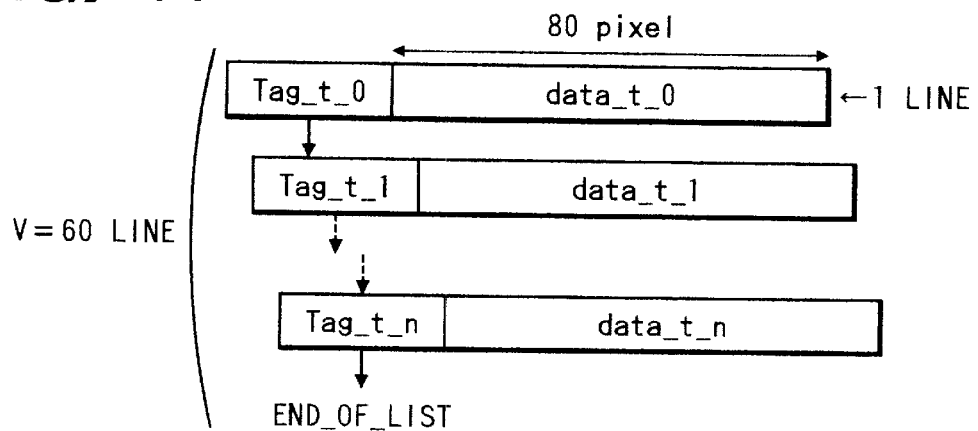
FIG. 11 is a diagram showing the memory structure of thumb-nail data.

The thumb-nail task performs thinning of YUV data and conversion of thinned YUV data into RGB data. FIG. 11 shows the structure of thumb-nail data generated on DRAM 10. This thumb-nail data is hereinafter called a thumb-nail list. Since the thumb-nail data is 80×60 pixel RGB data, the corresponding thumb-nail list is a unidirectional linked list of 80 pixels×60 lines. One pixel is constituted of three bytes. Each thumb-nail line is added to a thumb-nail list generated when necessary.

FIGS. 12A to 12C are diagrams illustrating the thumb-nail concept. FIG. 12A shows an example of YUV data of the image processing list. Y data is present at each pixel and U and Y data are present at every second pixel. FIG. 12B shows an example of YUV data of the thumb-nail list, and YUV data are present at each pixel. For example, if $PIX_n$ shown in FIG. 12A corresponds to a pixel sampled for $PIX_j$ shown in FIG. 12B, data at $Y_n$ is copied to $Y_j$, data at $U_n$ is copied to $U_j$, and data at $V_{n-1}$ or $Y_{n+1}$ is copied to $Y_j$. If the corresponding pixel is $PIX_n$ shown in FIG. 12A, $Y_{n+1}$ is copied to $Y_j$, $U_n$ or $U_{n+2}$ is copied to $U_j$, and $V_{n+1}$ is copied to $V_j$.

After the completion of one line thinning, the thumb-nail task performs a table conversion from YUV data into RGB data as from FIG. 12B to FIG. 12C. In this case, high speed memory sampling and high speed RGB conversion become possible, by generating memory blocks for the lists shown in FIGS. 11B and 11C assuming that they are not the same, on a high speed local memory of CPU 8.

The above operations are for thinning in the horizontal direction. Thinning in the vertical direction can be performed by neglecting lines to be sampled. The thumb-nail task performs thinning in accordance with a data request response from the color image processing task. For example, in thinning the image processing data of 832×608 pixels to 80×60 pixels, upper and lower 4 pixels and right and left 16 pixels are neglected, and a center pixel or a nearby pixel of each set of 10×10 pixels in 800×600 pixels is sampled. For the image processing data of 640×480 pixels, a center pixel or a nearby pixel of each set of 8×8 pixels is sampled, and for the image processing data of 320×240 pixels, a center pixel or a nearby pixel of each set of 4×4 pixels is sampled. By changing the sampling frequency for the original image size both in the horizontal and vertical directions in the above manner, the thumb-nail data of the same size can always be generated.

The thumb-nail task does not refer to YUV data as the image processing list, but it receives information on a pointer to the start of PIX, data intervals between Y, U and V, and the like from the image processing task to perform the thumb-nail process. If sampling and RGB conversion of YUV data of 32 lines of the processed list are completed, the thumb-nail task returns the request return information itself supplied from the image processing task as a data request return from the JPEG task, and the JPEG task starts its operation.

(JPEG process)

The JPEG task performs a raster block conversion by software, then performs orthogonal conversion such as a DCT conversion, quantizes the converted coefficients, and Huffman encodes through quantization after zig-zag conversion. The JPEG circuit 202 performs JPEG compression to form a JPEG file of YUV 422. Prior to the JPEG process, the JPEG task initializes the JPEG circuit 202 and sets the data bus for the DSP block. Specifically, the JPEG circuit 202 is set to a compression mode via the controller 206 to set quantization table data and Huffman table data. The table data is loaded in accordance with one of the JPEG qualities of three steps designated by a user through the input device 16.

In DSP 6, the controller 206 operates to set a direction from the bus interface 207 to JPEG circuit 202 to FIFO No. 3 201, a direction from the JPEG circuit 202 to bus interface 207 to FIFO No. 4 203, and an image data input and compressed data output to the JPEG circuit 202. Therefore, a data path is established from the YUV data on the memory, programmed IO (PIO), bus interface 207, FIFO No. 3 201, JPEG circuit 202, FIFO No. 4 203, bus interface 207, DMA channel No. 2, and to compressed data on the memory.

The JPEG task reserves a buffer of several K bytes for compression data storage in DRAM 10 and sets a buffer start pointer as the transfer destinating address of the channel No. 2 of DMAC 7, a direction from a device to a memory as the transfer direction, and a compression buffer size as the transfer number. Thereafter, the YUV data is converted into a raster block and input to. FIFO No. 3 201 through PIO, and an output of FIFO No. 4 203 is DMA transferred to the compression data buffer to thereby complete the JPEG process.

Figure 13A:
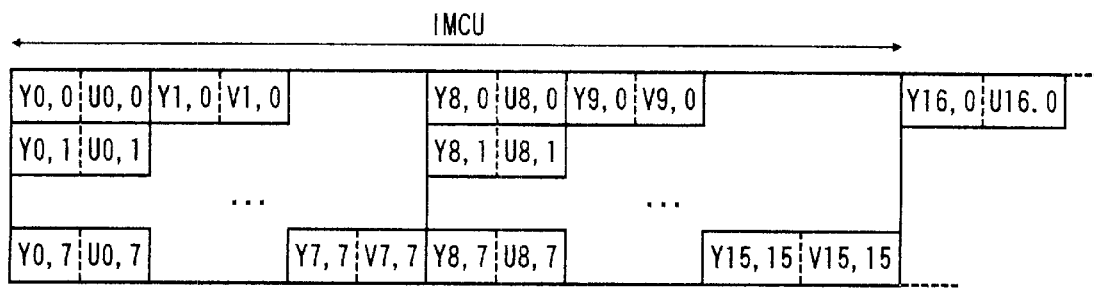
FIGS. 13A and 13B are diagrams illustrating the concept of raster block conversion.
Figure 13B:
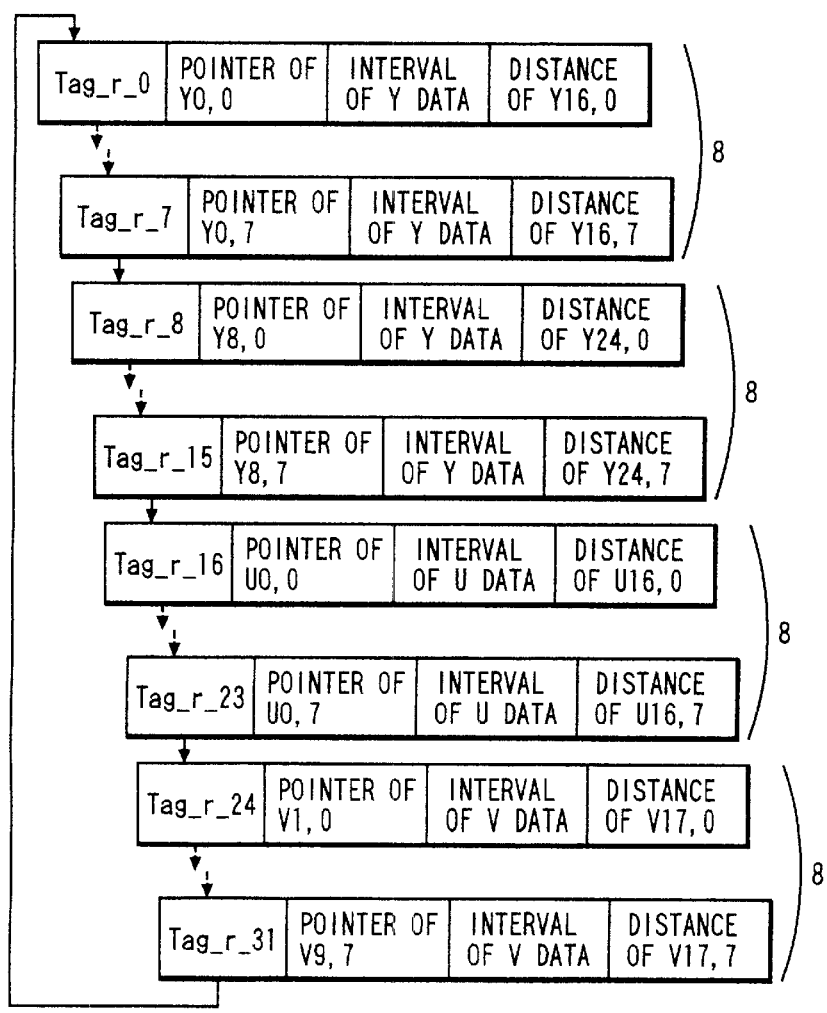

FIGS. 13A and 13B are diagrams illustrating the concept of raster block conversion. FIG. 13A shows one minimum code unit (MCU) which is a JPEG processing unit of YUV422. This YUV422 uses two 8×8 data blocks for Y and one 8×8 data block as its minimum processing unit MCU. FIG. 13B shows the structure of a ring buffer used for raster block conversion. A symbol such as Y0,0 corresponds to the symbol shown in FIG. 13A.

The raster block conversion will be described with reference to FIGS. 13A and 13B. A raster block conversion module refers to Tag r 0 shown in FIG. 13B to obtain the address of Y0,0, reads the data Y0,0, and writes it to a JPEG port of the bus interface 207. The data written to the JPEG port is loaded in FIFO No. 3 201 and input to the JPEG circuit 202 at a predetermined timing. Next, the Y data interval is referred to and added to a Y0,0 pointer to obtain the address of Y1,0 and read and write it to the JPEG port. After the data up to Y7,0 is written in the similar manner, a distance to Y16,0 is added to the Y0.0 pointer to update the Y0,0 pointer for the next MCU. In order to obtain the next raster pointer, Tag r 1 is obtained by referring to Tag r 0 to thereby read pointer data of Y0,1.

In the similar manner to the above, read/write up to data Y7,7 completes the raster block conversion of the first block. Thereafter, Tag r 8 is obtained by referring to Tag r 7, and the raster block conversion for the second block of Y is performed. Similarly, Tag r 16 is obtained by referring to Tag r 15 to perform the raster block conversion of the U block, and Tag r 24 is obtained by referring to Tag r 23 to perform the raster block conversion of the V block. In the above manner, the raster block conversion of one MCU is completed. By obtaining Tag r 0 by referring to Tag r 31, the raster block conversion of the next MCU can be performed in the similar manner.

The above operations are repeated 52 times for the raster block conversion of 832 pixels×8 lines, 40 times for the conversion of 640 pixels×8 lines, and 20 times for the conversion of 20 times. These operations are further repeated 4 times by the JPEG task to complete the raster block conversion of the image processing data of 32 lines and the input thereof to the JPEG circuit 202.

The compressed data output from the JPEG circuit 202 is loaded in FIFO No. 4 203. When FIFO No. 4 203 becomes full, the controller 206 issues a DMA request of the channel No. 2 to properly perform DMA transfer to the compression buffer. The JPEG task checks the completion of DMA, and if completed, the data in the compression buffer is loaded into a file to set again DMAC 7. After the input of YUV data of all 32 lines is completed, a data request is issued to the thumb-nail task for processing the next 32-line block, to thereby start the next process sequence.

The above-described raster block conversion method is extendable and compatible with various JPEG formats such as YUV444, YUV411, and grey scale, by changing the raster block conversion data structure shown in FIG. 13B, even if the same raster block conversion software module is used. Higher speed processing becomes possible by forming the raster block conversion ring buffer on a high speed local memory of CPU 8. The information such as a pointer and data interval shown in FIG. 13B is generated by the JPEG task in accordance with the request response from the image processing task acquired via the thumb-nail task. Instead of PIO transfer of image data to FIFO No. 3 201, the image data may be DMA transferred by additionally providing a DMA channel and copying raster block conversion data to a temporary memory.

All signal processing sequences are completed by repeating the above-described color image processing, thumb-nail image data processing and JPEG processing. Thereafter, the thumb-nail task adds a predetermined header to the thumb-nail list to generate an RGB thumb-nail file as a TIFF file. If a device abnormality is detected during data processes, each task issues a fatal error notice. This fatal error notice is also issued when a file write is failed because of unexpected states, such as opening a cover of the external storage device 18 during file write and an insufficient empty capacity of the external storage device 18. If the fatal error notice is issued, the system is shut down after a minimum necessary error process is performed.

(Monochrome photographing and JPEG recording)

This process is similar to the color photographing and JPEG recording up to the signal processing and record sequence. However, when a user selects a monochrome mode by using the color/monochrome turnover switch SW of the input device 18, the quartz low-pass filter of the optical unit 1 is dismounted mechanically. The image processing of the monochrome photographing and JPEG recording is different from the color mode, but other operations are almost the same as the color mode. Therefore, the monochrome image processing will be described mainly hereinafter.

(Monochrome image processing)

Figure 14:
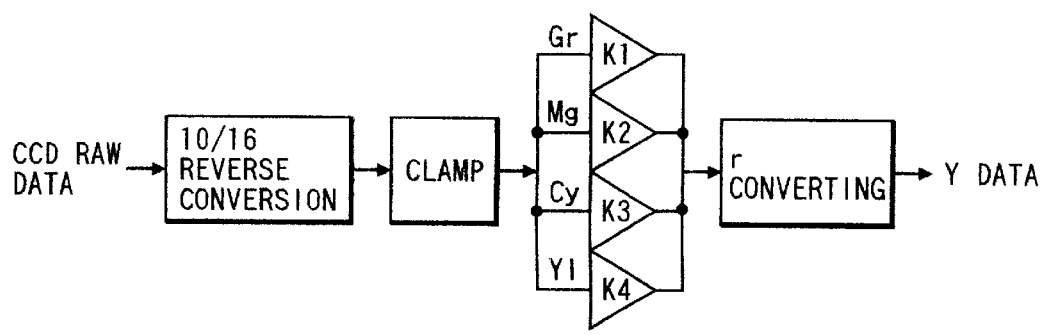
FIG. 14 is a diagram illustrating the concept of monochrome image processing.

FIG. 14 illustrates the concept of monochrome image processing. In the monochrome image processing, CCD RAW data is subjected to 10/16 inverse conversion, and the clamped data is multiplied by a coefficient corresponding to each CCD optical filter and subjected to gamma conversion to generate Y data of 8 bits per pixel. The details of this process will be given hereinafter. The data structure similar to the processed color image list shown in FIG. 9 is used also for the monochrome image processing, and this process is executed in the unit of 32 lines.

First, a monochrome image processing task obtains through a predetermined evaluation method a coefficient K1 for Gr, a coefficient K2 for Mg, a coefficient K3 for Cy, a coefficient K4 for Yl and an OB average value similar to the color image processing. Then, the following hardware setting is executed. Referring to FIG. 1, the monochrome image processing task sets SEL No. 1 208 to the contact b, SEL No. 2 210 to the contact b, SEL No. 3 212 to the contact c, and the tri-state buffer 214 to an open state. Further, the 10/16 converting circuit 209 is set to an inverse conversion mode, and the clamp circuit 211 is set with the previously obtained OB average, and FIFO No. 1 213 is set to a multiplier mode. A data bus is therefore established from the bus interface

207, 10/16 converting circuit 209, clamp circuit 211, FIFO No. 1 213, and to bus interface 207.

The monochrome image processing task then sets K1 and K2 as the coefficients of the multiplier of FIFO No. 1 213 and starts monochrome image processing from data even 2 of the CCD list. Specifically, data even 2 is obtained by referring to Tag, the memory block of Tag even 0.1 is released, the top five words of data even 2 is DMA transferred via the channel No. 2 by setting DMAC 7 in a predetermined manner and subjected to 10/16 inverse conversion by the 10/16 converting circuit 209 to recover data of 8 pixels. This 8-pixel data is shifted to a predetermined level by the clamp circuit 211 and input to FIFO No. 1 213.

FIFO No. 1 213 multiplies odd data by K1 and even data by K2 and stores lower ten bits as valid image data. Thereafter, the monochrome image processing task again sets DMAC 7 to sequentially transfer from FIFO No. 1 213 eight words starring from the top of data p 0. The above operations are repeated 106 times for the 832×608 size and 82 times both for the 640×480 and 320×240 sizes, to thereby complete the multiplication process for 1H. Thereafter, all pixels of data p 0 are gamma converted from 10-bit image data into 8-bit image data by using the conversion table, and moved forward by 9 pixels. Forward motion by 9 pixels is executed for position alignment with color data.

Next, K3 and K4 are set as the coefficients of the multiplier of FIFO No. 1 213, and the processed data is stored as data p 1. Similarly thereafter, data even 3 is obtained by referring to Tag even 1 and then Tag even 3, the memory block of Tag even 2 is released, and the even field is subjected to the monochrome image processing to store the processed data as data p 2. Similarly, data odd 3 is obtained by referring to Tag odd 2 and then Tag odd 3, the memory block of Tag odd 2 is released, and the odd field is subjected to the monochrome image processing to store the processed data as data p 3. These operations are repeated 15 times to complete processing 32 lines. In the case of the 320×240 size, however, only one field is sufficient so that one of odd and even fields of the CCD list is subjected to the monochrome image processing. Since releasing the CCD list and generating the image processing list are sequentially executed one line after another similar to the color image processing, the monochrome image processing can be executed smoothly without giving too much load on the memory.

Thereafter, Y image constituent data information is returned to the thumb-nail task as a data request response, the information including the number of lines, the number of pixels per line, the number of bits per pixel, the pointer to the start of a line block, a data interval and the like. The thumb-nail task executes only Y data thinning similar to the color processing as illustrated in FIGS. 12A to 12C. Since data thinning for U and V is not necessary, a thumb-nail list having one byte per pixel may be used for the monochrome image processing.

After the completion of the thumb-nail image processing, the JPEG task receives a data request response so that the JPEG process starts similar to the color image processing. In this case, however, the JPEG task sets all 1s or values near 1 to the data of the quantization table of the JPEG circuit 202 to thereby disable quantization. Since U and V data are not present, the raster block conversion structure shown in FIG. 13B is changed to a ring buffer of 16 stages for only first two Y's. The raster block conversion for only Y is executed to generate a non-quantized JPEG file of grey scale. This non-quantized JPEG file is pseudo loss-less compression data without block distortion, and can be used for recording characters or the like with good quality. Even if quantization is not performed, Huffman coding is performed so that a normal image has a compression factor of about ½.

All signal processing sequences are completed by repeating the above-described color image processing, thumb-nail image data processing and JPEG processing. Thereafter, the thumb-nail task adds a predetermined header to the thumb-nail list to generate a grey scale thumb-nail file as a TIFF file. As described above, the thumb-nail image as a subimage can be formed both for monochrome and color images. It is therefore possible to discriminate between color and monochrome of a base image by viewing the thumb-nail file. If a device abnormality is detected during data processes, each task issues a fatal error notice. This fatal error notice is also issued when a file write is failed because of unexpected states, such as opening a cover of the external storage device 18 during file write and an insufficient empty capacity of the external storage device 18. If the fatal error notice is issued, the system is shut down after a minimum necessary error process is performed.

(Color photographing and RAW recording)

This process is similar to the color photographing and JPEG recording excepting that a RAW file and a JPEG file are not generated. Prior to all signal processing, a predetermined RAW file header is added to the CCD list to record a CCD RAW file, and thereafter only the thumb-nail task and color image processing task are executed. In this case, the thumb-nail task operates as a master. By properly repeating the color image processing and thumb-nail processing, all the signal processing sequences are completed. At this time, the thumb-nail task adds a predetermined header to the thumb-nail list to form an RGB thumb-nail file as a TIFF file.

If a device abnormality is detected during data processes, each task issues a fatal error notice. This fatal error notice is also issued when a file write is failed because of unexpected states, such as opening a cover of the external storage device 18 during file write and an insufficient empty capacity of the external storage device 18. If the fatal error notice is issued, the system is shut down after a minimum necessary error process is performed.

(Monochrome photographing and RAW recording)

This process is similar to the monochrome photographing and JPEG recording excepting that a RAW file and a JPEG file are not generated. Prior to all signal processing, a predetermined RAW file header is added to the CCD list to record a CCD RAW file, and thereafter only the thumb-nail task and monochrome image processing task are executed. In this case, the thumb-nail task operates as a master. By properly repeating the monochrome image processing and thumb-nail processing, all the signal processing sequences are completed. At this time, the thumb-nail task adds a predetermined header to the thumb-nail list to form a grey scale thumb-nail file as a TIFF file.

If a device abnormality is detected during data processes, each task issues a fatal error notice. This fatal error notice is also issued when a file write is failed because of unexpected states, such as opening a cover of the external storage device 18 during file write and an insufficient empty capacity of the external storage device 18. If the fatal error notice is issued, the system is shut down after a minimum necessary error process is performed.

By changing the file storage format of JPEG data and thumb-nail data, hierarchical files can be used as will be described hereinunder. The hierarchical file is, for example, a PIX file having a file format called a flash PIX.

Figure 15:
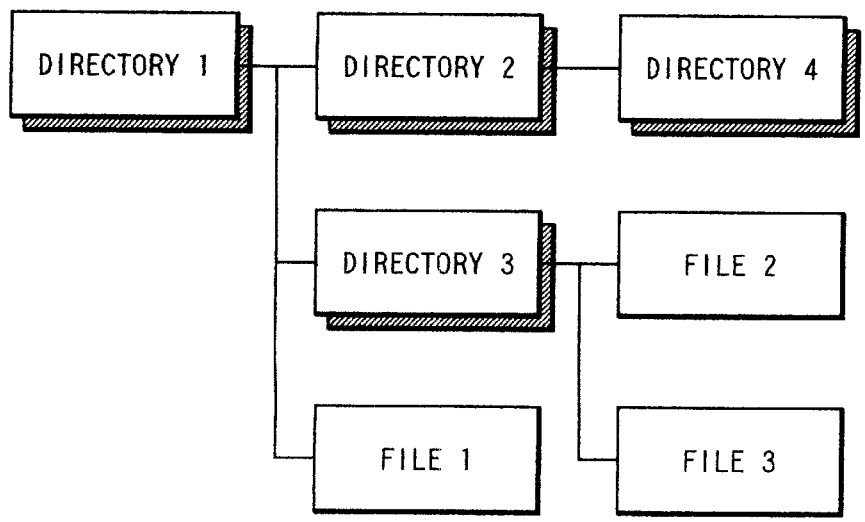
FIG. 15 is a diagram showing a memory format according to an embodiment of the invention.

The details of a PIX file format will be given hereinafter. FIG. 15 is a block diagram showing the structure of a PIX file.

(I) File Structure (1) The storage format of a PIX file is constituted of objects of two types called a directory (with shading) and a file (without shading).

In the example shown in FIG. 15, a directory No. 1 is a root directory at the highest layer of the storage format. The directory No. 1 contains two directories Nos. 2 and 3 and one file No. 1. The directory No. 2 contains an empty directory No. 4, and the directory No. 3 contains two files Nos. 2 and 3.

Image information and image attribute information are stored in a structural format using two types of objects.

(2) Structure of Image File

Figure 16:
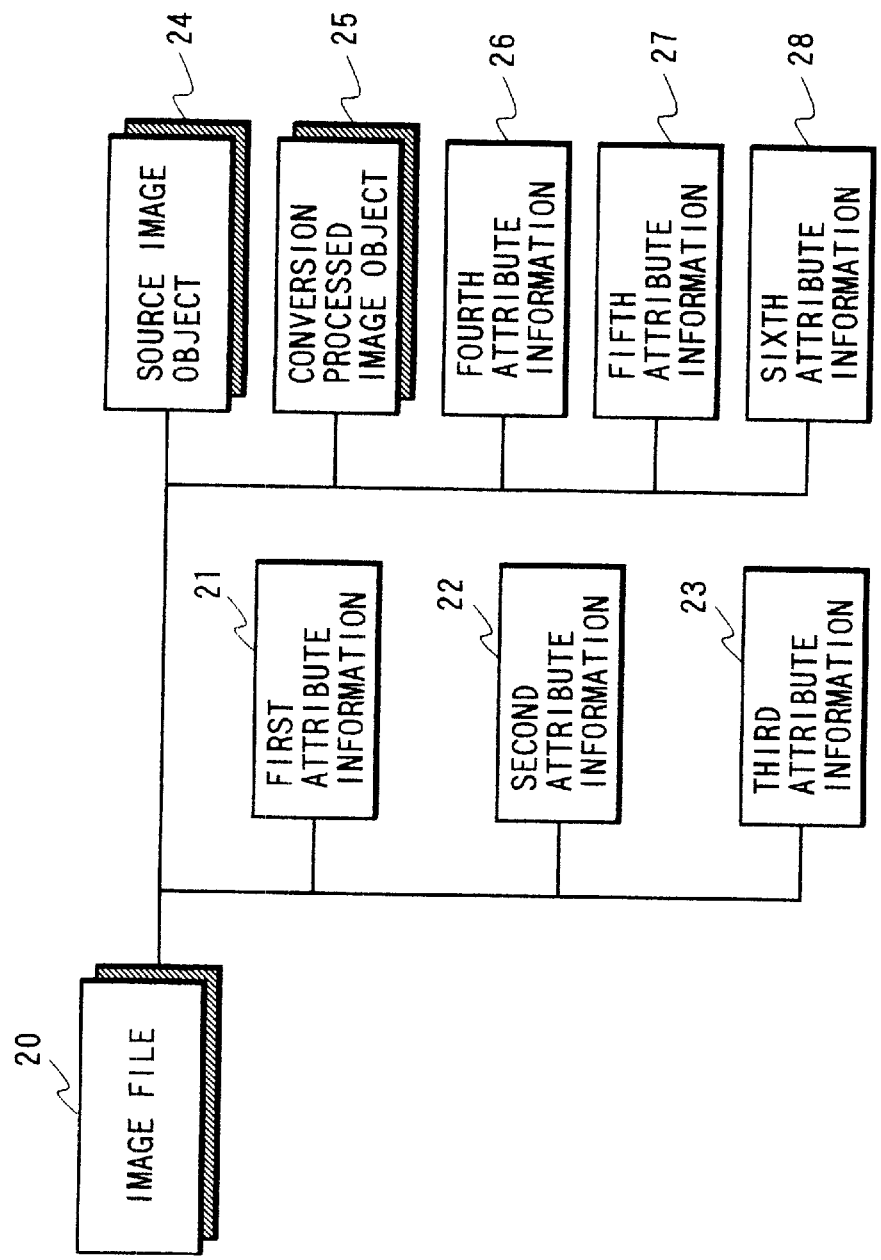
FIG. 16 is a diagram showing the structure of an image file with the memory format of the embodiment.

As shown in FIG. 16, each image file contains the following elements.

(a) First Attribute Information 21 (Summary info. property set)

This information is image summary information such as: a format ID; a title; a producer; a keyword; a comment; a last save person; a revision number (the number of objects saved); a total edit time; a final print date; an original production date; a last save date; a thumb-nail attribute; a produced application name; and the like. As optional attribute information, a reduced bitmap image to be used as a thumb-nail image may be inserted.

(b) Second Attribute Information 22 (CompObj stream)

General information of an object to be recorded, such as: a header; a user type; and a clip board format.

(c) Third Attribute Information 23 (Global info. property set)

Information regarding output images such as: a locked property list; a converted image title; a last modified person; an output image index; a maximum image index; a maximum conversion item index; a maximum operation index; and the like.

(d) Source Image Object 24

This object is constituted of image information and its attribute information of a source image. The details will be later given.

(e) Conversion Processed Image Object 25

This object is constituted of image information and its attribute information obtained by converting a source image by a predetermined process. The structure of this object is the same as the source image object.

(f) Fourth Attribute Information 26 (Source desc. property set)

This information is addition information of an original image or a conversion processed image, such as: an image ID of a source image object or a conversion processed image object; a locked property list; a title; a last modified person; a revision number; a production date; a last modified date; a produced application name; a status; the number of conversions; a conversion process list; a height/width of a contained image; and the like.

(g) Fifth Attribute Information 27 (Reslt desc. property set)

This information is attribute information regarding conversion of information of a source image, such as: a conversion item ID; an operation class ID; a locked property list; a conversion title; a last modified person; a revision number; a production date; a last modified date; a produced application name; an input data list; an output data list; an operation number; a processed aspect ratio; a target rectangle area; a filtering; a geometric calculation; a color conversion matrix; a contrast adjustment; and the like.

(h) Sixth Attribute Information 28 (transform property set)

This information identifies software for the execution of conversion.

(3) Structure of Image Object 30

Figure 17:
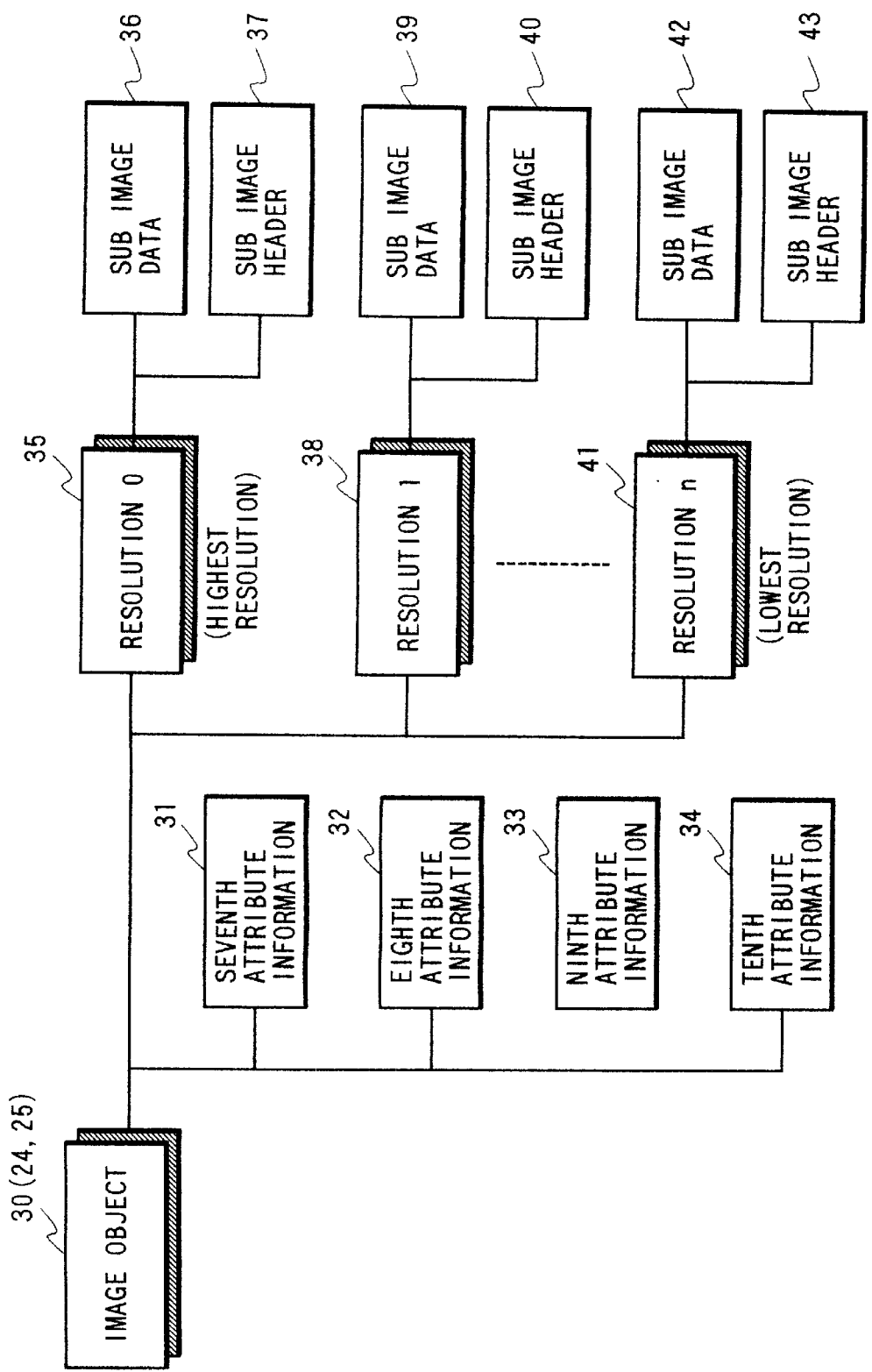
FIG. 17 is a diagram showing the structure of an image file with the memory format of the embodiment.

The following elements shown in FIG. 17 are contained in the source image object 24 and conversion processed image object 25.

(a) Seventh Attribute Information 31 (Summary info. property set)

This information is image summary information of the source image object and conversion processed image object, such as: a format ID; a title; a producer; a keyword; a comment; a last save person; a revision number (the number of objects saved); a total edit time; a final print date; an original production date; a last save date; a thumb-nail image; a thumb-nail image attribute; a produced application name; and the like.

(b) Eighth Attribute Information 32 (CompObj stream)

General information of an object to be recorded, such as: a header; a user type; and a clip board format.

(c) Ninth Attribute Information 33 (Image contents property set)

Information regarding a storage method of an image such as: a resolution number Nres.; a width and height of an image at a maximum resolution; a width and height of a default display image; a unit of width and height of a display image; a width, height, color and format of a subimage; a reduction method (a method of generating images at a plurality of resolutions); a width of a reduction pre-filter; a color process profile of a subimage; a compression parameter (for example, in JPEG compression, quantization table data, Huffman table data, SOI, DQT, DHT, EOI, and so on); and the like.

(d) Tenth Attribute Information 34 (Image info. property set)

Information associated with image information, such as: a file source (image sources such as a device, a scene type, an image production history, a production software name, a user defined ID and a sharpness value); an intellectual property right (copyright indication, proprietor of an original image, a proprietor of a digital image, a producer, a remark); contents descriptive information (correction data for image, description of image group, description of an image title or an object, description of persons in an image, description of materials in an image, an original image date, description of events in an image, description of locations in an image, a remark); information on a camera used for image pickup (camera maker name, camera model name, camera manufacture number); information of camera setting during photographing (photographed date, shutter speed, aperture value, exposure program, luminance (BV value) exposure correction, photographing distance, photometry method, light source, focal length, open aperture value, flash, guide number, flash confirmation, backlight, subject position, photographed frame number, special effect filter, remark); digital camera characteristics (type of image sensor, focal plane X resolution, focal plane Y resolution, focal plane resolution unit, spatial frequency characteristics, color filter array pattern, spectrum sensitivity, ISO speed ratings, OECF); film information (film brand, film category, film size, film roll number, film frame number): original document scan descriptive information for an original such as a book and a printed matter (original scan image size, original document size, original media, original type); scan device information (scanner maker, scanner model name, manufacture number, scanner software, scanner version number, scanner service company name, scan person ID, scan date, last corrected date, scanner pixel size); and the like.

This information can be referred to when an image is used, for example, for checking in what way an image was photographed or can be used.

(e) Image Information

An image is constituted of image data (subimage data) 35, 39 and 42 at a plurality of resolutions 35, 38 and 41 corresponding to the resolution number Nres. and headers 37, 40 and 43 of the subimage data at the plurality of resolutions. Reference numeral 35 represents image data which is not subjected to a reduction process, called a maximum resolution storage. Reference numeral 41 represents an image having a minimum resolution of 64×64 pixels of one frame.

A file structure constituted of image data at a maximum resolution and its header may be used, instead of image data at a plurality of resolutions.

Each of the headers 37, 40 and 43 contains: a header stream length; an image width and height; a tile number to be described later; a tile width and height; a channel number; a tile header table offset; a tile header entry length; a tile header table (constituted of a tile offset; a tile size; a compression type; a compression sub-type and the like); and the like.

The tile offset indicates the position of a tile. The tile size indicates the data amount of a tile. The compression type indicates whether the tile data is uncompressed data, single color data, or JPEG compressed image data, or whether the tile data has no valid image data. The compression sub-type indicates the color if the data is single color data, whereas if the data is JPEG compressed data, it indicates an interleave type, chroma sub-sampling method, presence/absence of internal color conversion, and presence/absence of any change in a JPEG table.

Figure 18:
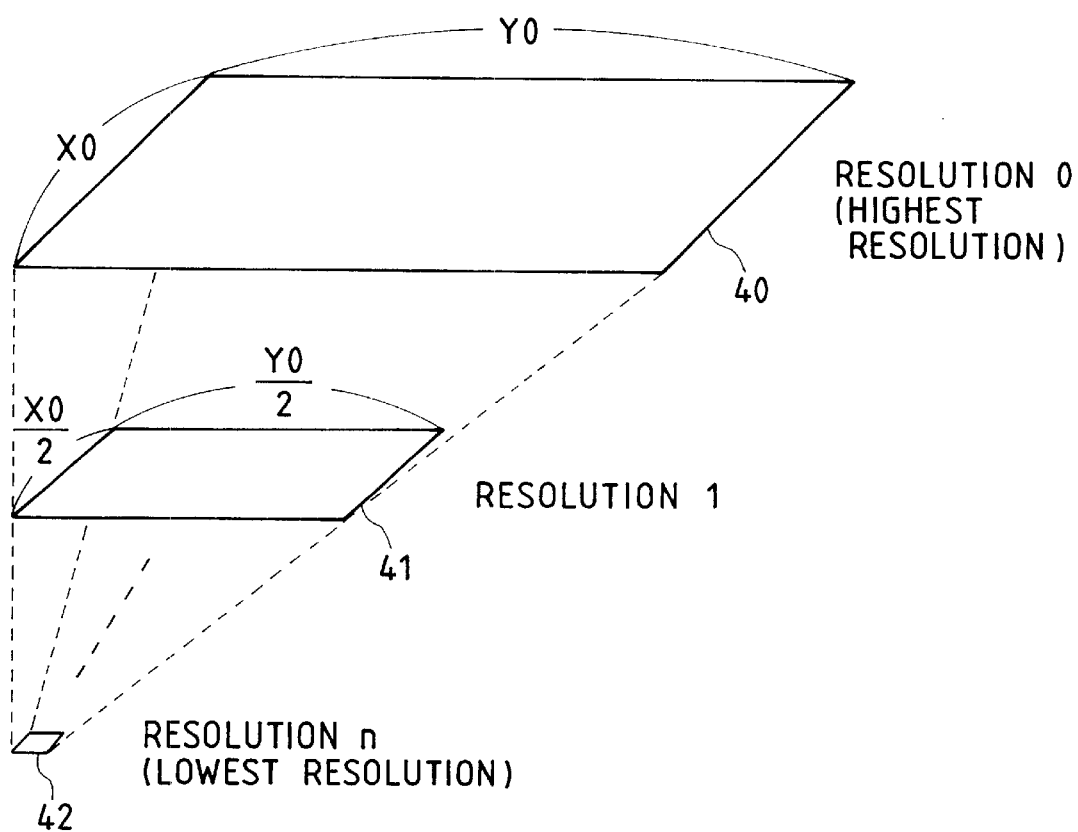
FIG. 18 is a diagram showing an example of an image file constituted of a plurality of images with different resolutions.

FIG. 18 shows an example of an image file constituted of a plurality of images with different resolutions. Referring to FIG. 18, a maximum resolution image 40 has X0×Y0 in columns and rows. The next largest resolution image 41 has X0/2×Y0/2. Other images down to a minimum resolution image 42 are also stored in this image file, by sequentially reducing the column and row by ½ until the column and row becomes M×N pixels or smaller.

With this hierarchical structure of the image file, the number of hierarchical layers in one image file is required as image attribute information, and for the image at each hierarchical layer, its header information and image information are required. Information regarding the number of hierarchical layers in one image file, the width and height of the maximum resolution image, the width and height of each resolution image, color configuration, compression method and the like is described as the first attribute information 21.

Figure 19:
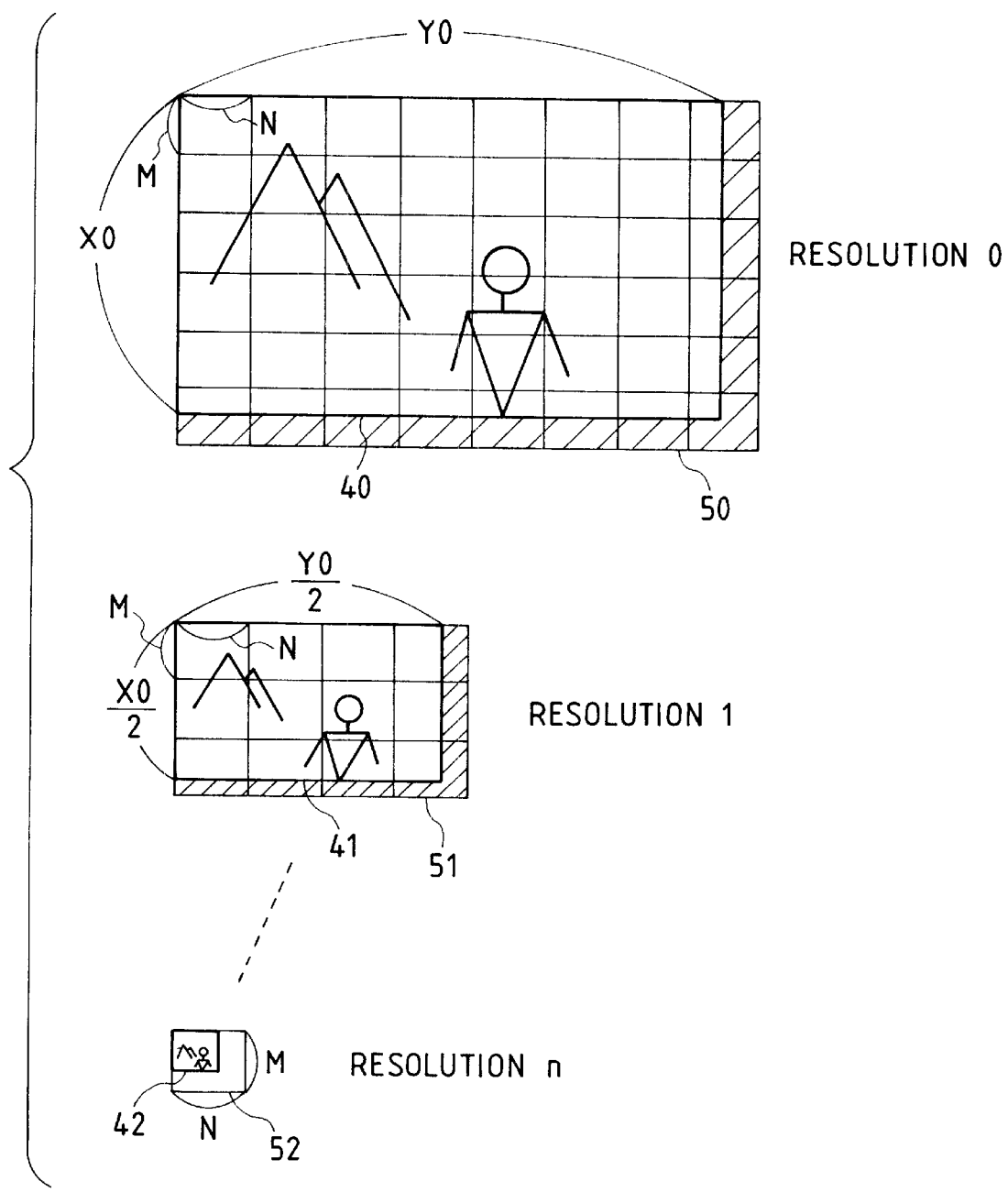
FIG. 19 is a diagram illustrating an example of tile division.

As shown in FIG. 19, an image at each resolution layer is divided into tiles of M×N pixels. If the image is divided sequentially into tiles of M×N pixels from the left upper corner of the image, an empty area may be partially formed in tiles at the right side and bottom side (hatched areas), depending upon the size of an image. In this case, pixels are repetitively inserted into tiles at the right and bottom sides to form tiles of M×N pixels.

The image of each tile is recorded in the data format of either JPEG compression, single color, or uncompression. The JPEG compression is an image compression method internationally standardized by ISO/IEC JTC1/SC29. The single color data generates a tile substantially made of one color by using this single color without storing values of pixels. This data format is particularly effective for images generated by computer graphics.

Tile-divided image data is stored in a subimage data file, and the subimage header contains all information including the total number of tiles, the size of each tile, the data storage start position, the data format, and the like.

Figure 20:
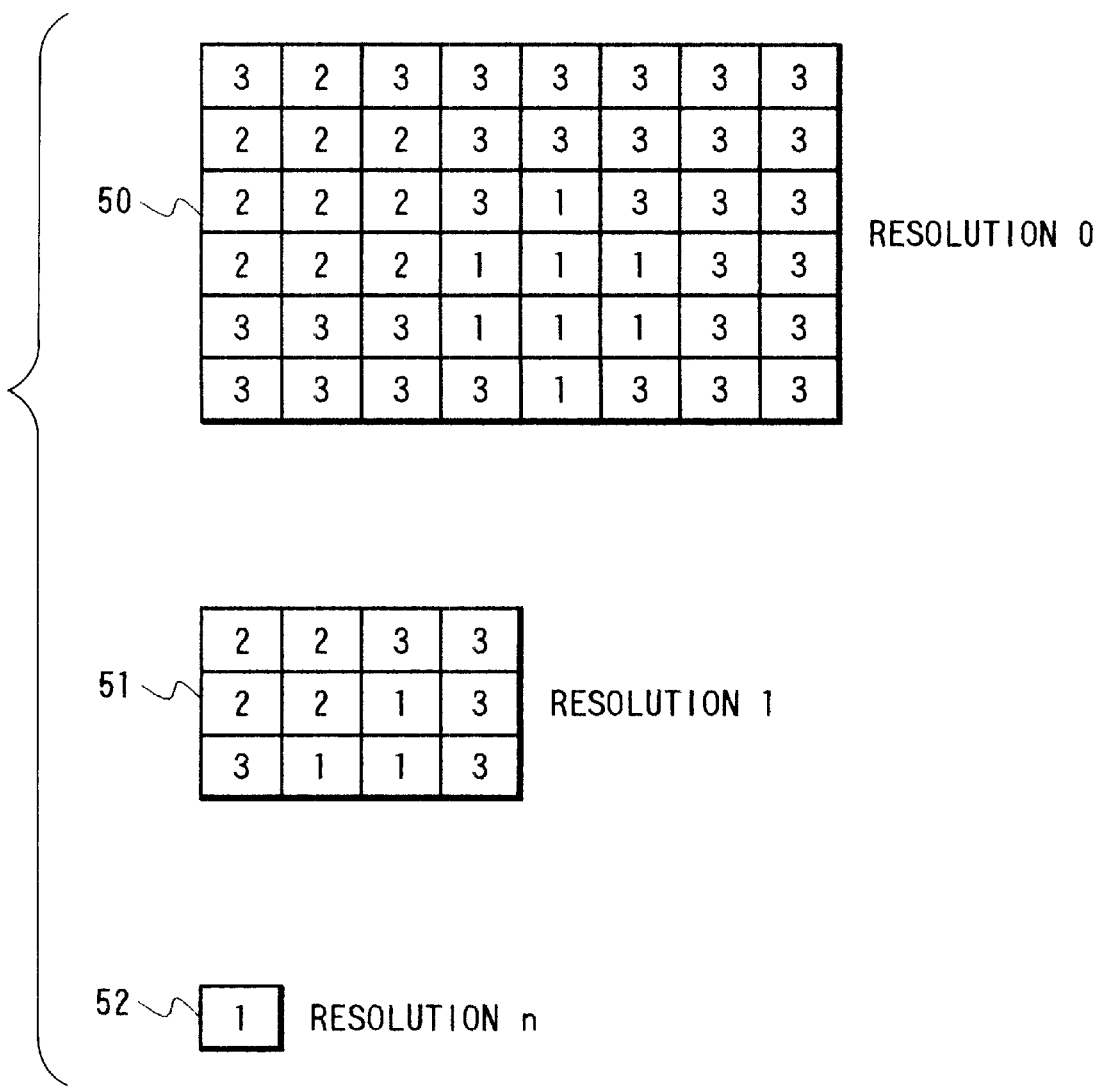
FIG. 20 is a diagram showing an example of data distribution of each image after the tile division.

FIG. 20 shows an example of distribution of the data format of each tile of images 50, 51 and 52 divided from the images 40, 41 and 42 shown in FIG. 19. Referring to FIG. 20, an attribute No. 1 indicates uncompression, an attribute No. 2 indicates JPEG compression, and an attribute No. 3 indicates single color.

If the attributes of each tile of an image at the resolution 0 are determined, the attributes of tiles of the images at the resolution 1 to n can be easily obtained by a predetermined rule.

For example, if all the four tiles at the resolution 0 corresponding to one tile at the resolution 1 have the attribute 1 (uncompression), the tile at the resolution 1 is determined to have the attribute 1, if all the four tiles have the attribute 3 (single color), the tile at the resolution 1 is determined to have the attribute 3, if one of the four tiles has the attribute 2 (JPEG), the tile at the resolution 1 is determined to have the attribute 2, and if the four tiles have both the attributes 1 and 3, the tile at the resolution 1 is determined to have the attribute 1.

Next, the hardware structure used in combination with the digital camera in this embodiment will be described.

(II) Hardware Structure

Figure 21:
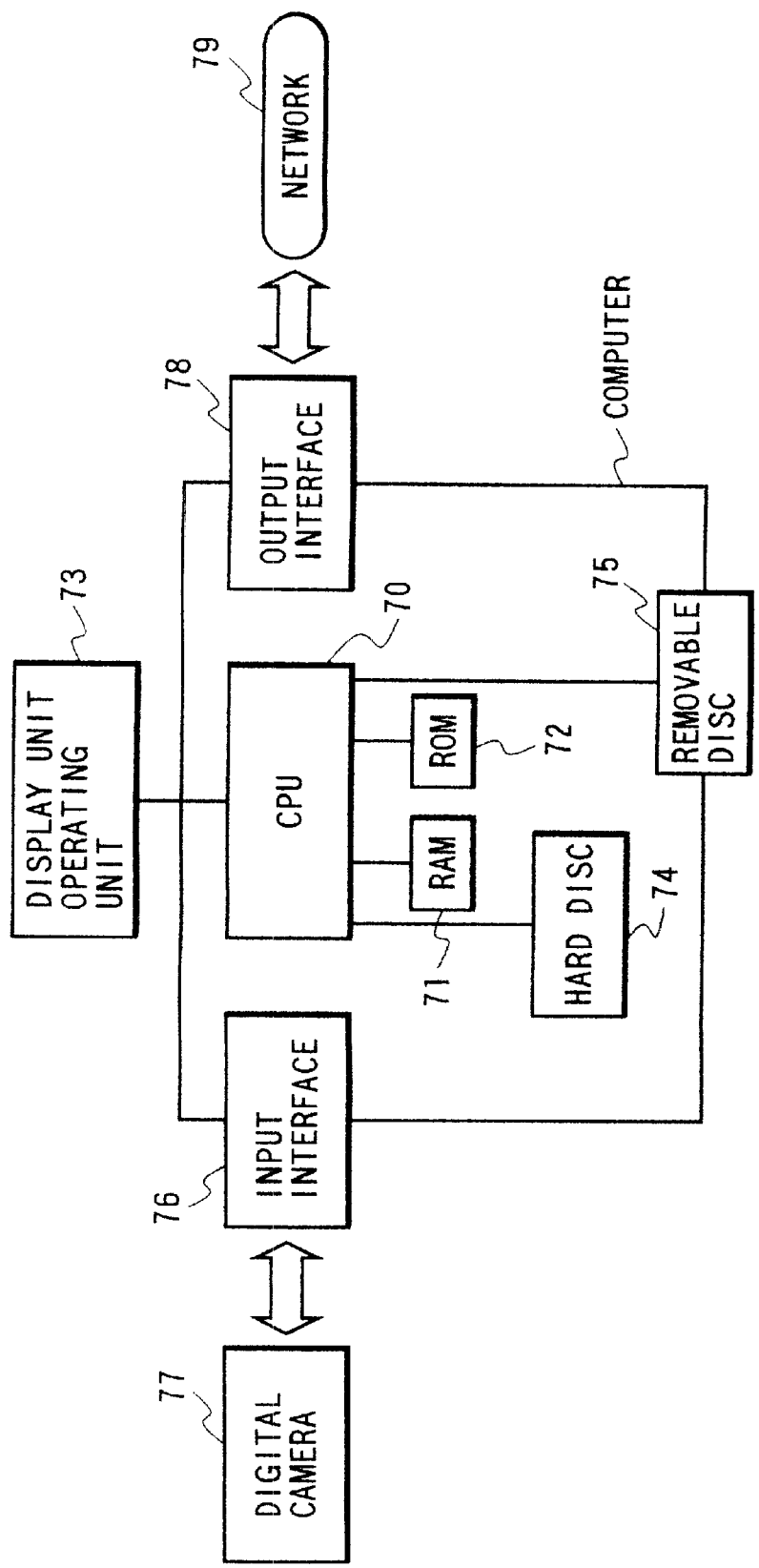
FIG. 21 is a block diagram showing an example of the hardware structure according to an embodiment of the invention.

An example of the structure of hardware of this embodiment is shown in FIG. 21. In FIG. 21, reference numeral 70 represents a CPU which is used for the execution of processes to be described later. Reference numeral 71 represents a RAM which is used as a CPU working area or the like. Reference numeral 72 represents a ROM which stores programs to be executed by CPU. Reference numeral 73 represents an operating unit inclusive of a display unit which is used as a user interface. Reference numeral 74 represents a hard disk for storing data of the file format described above. Reference numeral 75 represents a removable disk such as CD-R, DVD-RAM, and floppy disk which is used for storing data of the above-described file format or other data. Reference numeral 76 represents a bidirectional input interface for inputting image information or other information from an input device 77 such as an image scanner, digital camera and digital video camera. Reference numeral 78 represents a bidirectional output interface for outputting information via a communication system such as a network 79 to an external apparatus.

The PIX file format can be used by changing the file storage format of JPEG data and thumb-nail data shown in FIG. 5. For the color photographing and JPEG recording, a save date and the like are registered in Summary info. property set of the image object of the PIX format, information on storage is registered in CompObj stream, the resolution number Nres., the width and height of an image, a JPEG table and the like are registered in Image contents property set, and photographing information and the like are registered in Image info. property set, respectively in predetermined groups.

A predetermined header is added to the thumb-nail data and stored as an RGB bitmap in Summary info. property set of the image object of the PIX format.

Each property set is loaded in the file.

Next, the JPEG processed data is stored in the file as a maximum resolution storage: subimage data stream. However, the resolution number Nres. in Image contents property set: Primary description group is set to 1. The color space in Image contents property set: Primary contents property set is set to PhotoYCC.

In the above manner, a file corresponding to the PIX format can be formed. Addition of a low resolution is performed by an application on the computer side whose structure is shown in FIG. 7. Namely, the application performs a filtering process for expanding the maximum resolution image and halving the spatial frequency band, relative to the PIX format object moved or copied to the computer file system from the flash ROM 12 or external storage device 18, thereafter thins every second pixel both in the vertical and horizontal directions to generate image data at a half resolution, and JPEG compresses the generated image data to store it in Subimage data stream as the second resolution image data. Similarly, the half resolution image data is thinned to quarter resolution image data and compressed to form a third Subimage data stream. Similar operations are repeated to generate up to a minimum resolution Subimage data stream. By changing the property set to a predetermined value, it becomes possible for the computer to add a low resolution Subimage data stream.

It is also possible to generate a PIX image object having Subimage data of all resolutions on the side of the digital camera, by operating a task called a sub-sample task to be described hereinafter, instead of operating the thumb-nail task shown in FIG. 5.

During the signal processing, the sub-sample task copies image processing data to its own task, performs two-dimensional filtering such as 8×8 to limit the bandwidth of the copied data, and thins every second pixel to generate a uni-directional linked list of image data (hereinafter called sampled image data) reduced by a half both in the vertical and horizontal directions from original image data. After the sampled image data is generated, the memory for the copied data is sequentially released. However, at the boundary of process units (32 lines of the original image), the memory for the copied data of the vertical 8 taps is not released until the next process unit starts, in order to avoid mismatch of filtering in the vertical direction. For the filtering of 8×8, the copied data may be subjected to one-dimensional variable separation independently in vertical and horizontal directions by using the filter function of the multiplier of FIFO 01(213).

Upon the completion of all processes by sequential execution of the image processing, sampling processing and JPEG processing, the maximum resolution JPEG image data and half resolution image data are generated. Next, the half resolution image data is subjected to the sampling processing and JPEG processing to generate the half resolution JPEG image data and quarter resolution image data. By repeating the above processes, Subimage data streams at all necessary resolutions can be generated. Subimage data at each resolution is sequentially stored in the stream without waiting for the completion of JPEG processing. Each property set is changed to a predetermined value. The minimum resolution image data may be RGB converted to be loaded as thumb-nail data in Summary info. property set. The memory amount necessary for the half resolution image data is (832/2)×(608/2)×2=252928 bytes because of the YUV422 format. Since the CCD list is released as the sampled image is generated, the whole processes can be executed by the memory having a capacity of 1 MB.

Similar to the color photographing and JPEG recording, processes for the monochrome photographing and JPEG recording can deal with both only the maximum resolution image data and other resolution image data. However, in this case, thumb-nail image data is stored as a grey scale bitmap in Summary info. property set of the PIX image object. The color space in Resolution Description Group of Image contents property set is set to monochrome.

In the case of the color photographing and JPEG recording, the PIX format can be processed by storing uncompressed CCD RAW data in Subimage data stream at a maximum resolution. However, on the digital camera side, Compression type field in Subimage header at a maximum resolution is set to Invalid tile, and on the computer side, image processing data of CCD RAW data is replaced by Subimage data stream at a maximum resolution. In this case, the compression type is either JPEG or uncompression. Compression type field of Subimage header at a maximum resolution is set to Uncompressed data for uncompression type, and to JPEG for JPEG compression. Thumb-nail data can be generated in a similar manner to the color photographing and JPEG recording. Subimage data stream at a low resolution can be generated either on the digital camera side or on the computer side in a similar manner to the color photographing and JPEG recording.

Also in the case of the monochrome RAW data recording, processes similar to the color photographing and RAW data recording can be used. However, thumb-nail data is stored as a grey scale bitmap in Summary info. property set of the PIX image object. The color space in Resolution Description Group of Image contents property set is set to monochrome.

In this embodiment, in order to set the color space in Image contents property set on the computer side, signal setting data is transferred via the input interface 76 to the computer shown in FIG. 21 by manually operating a color/monochrome turnover switch SW of the input device 16 of the digital camera shown in FIG. 21.

Processes for dealing with the PIX file format have been described in the above embodiment. If an application on the computer side generates Subimage data stream, a new Result image object may be generated instead of changing the image object.

Next, the procedure of forming a file on the side of the computer of this embodiment will be described with reference to FIGS. 22 to 27.

(Forming image file)

An example of the procedure of forming the previously described image file will be described.

Figure 22:
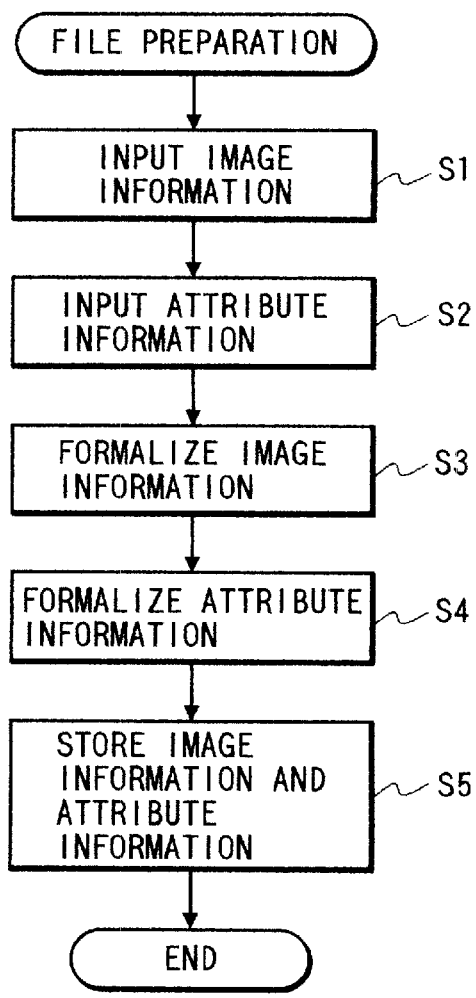
FIG. 22 is a flow chart illustrating a file forming procedure.

A basic procedure to be executed by CPU shown in FIG. 21 is illustrated in FIG. 22.

At Step S1, image information is input from the input device 77 via the input interface 76. The input device 77 is, for example, an image scanner, a digital camera, a digital video camera, or the like.

At Step S2, the first to tenth attribute information associated with the input image information is input. This information is input via the input interface 76 or manually via the operating unit 73.

At Step S3, the image information input at Step S1 is formatted into the image file having the structure described earlier.

At Step S4, the attribute information input at Step S2 is formatted into the image file having the structure described earlier.

At Step S5, the formatted image information and attribute information are stored in the hard disk 74 or removable disk 75.

Figure 23:
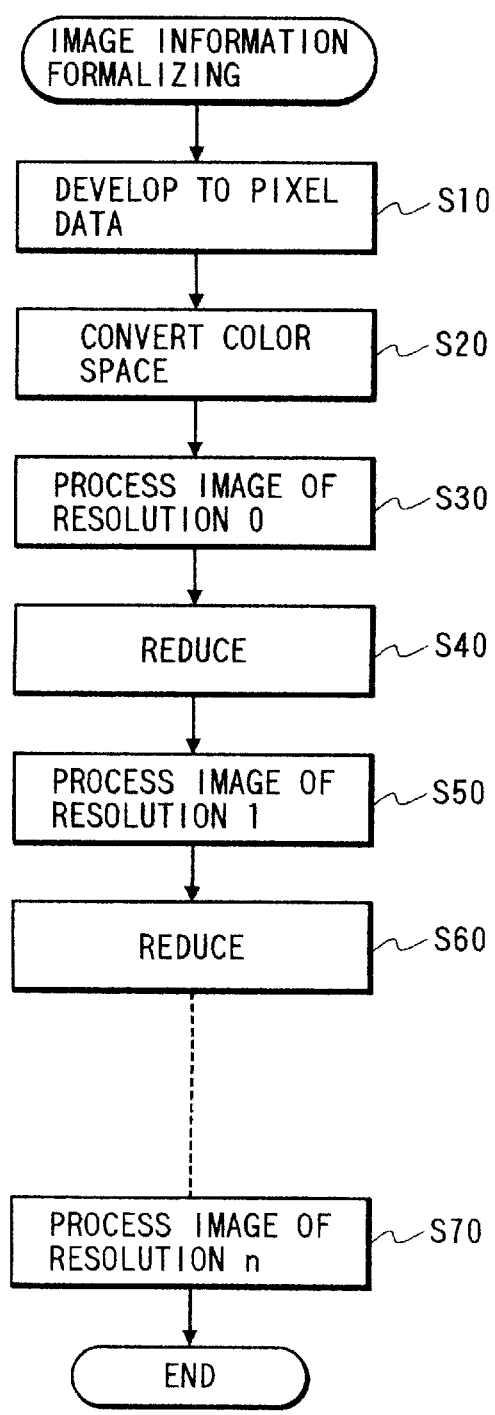
FIG. 23 is a flow chart illustrating an image information formatting procedure.

Next, the procedure of formatting the image information at Step S3 will be described with reference to FIG. 23.

At Step S10, the input image information is developed into each pixel data. For example, if the image information is input in the form of compressed format such as JPEG, an expansion process is executed, whereas if it is input in the form of PDL code, a development process is executed, to thereby generate each pixel data. If the size of the input image information is to be changed, the size is changed through trimming or variable magnification. If these processes are not necessary, this process is jumped.

At Step S20, if the color space of pixels is necessary to be changed, the color space is converted into a predetermined color space such as RGB (additive primary colors) and YCC (luminance and chromaticity).

At Step S30, the image at the maximum resolution 0 is formatted. The details thereof will be later described. If the image information is formatted only at the maximum resolution, the following Steps are not executed.

At Step S40, the resolution is reduced to a half. The reduction method has been formatted as the ninth attribute information.

At Step S50, the generated image at the resolution 1 is formatted.

At Step S60, the reduction process is executed similar to Step S40.

The reduction process and formatting process are requested thereafter, and at Step S70, the image at a resolution n is formatted to terminate this procedure.

Figure 24:
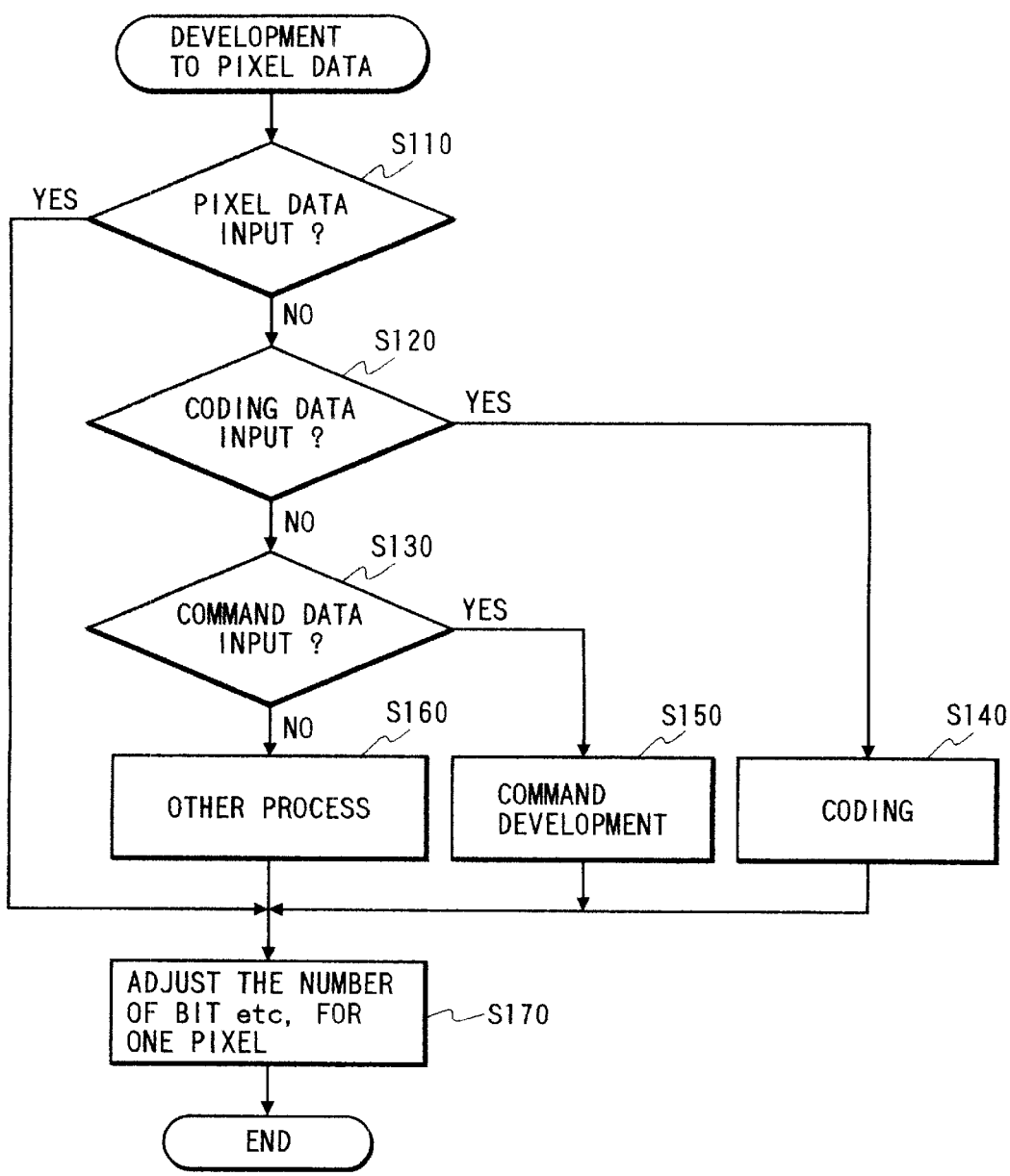
FIG. 24 is a flow chart illustrating a procedure of developing into pixel data.

Next, the procedure of developing into pixel data at Step S10 shown in FIG. 23 will be described with reference to FIG. 24.

At Step S110, it is checked whether or not the input image information is uncompressed pixel data. If it is uncompressed pixel data and unnecessary to execute the development process, the procedure advances to Step S170.

At Step S120, it is checked whether or not the input image information is coded data. If coded data, a decoding process is executed at Step S140.

At Step S130, it is checked whether the input image information is command data such as PDL. If command data, a command development process is executed at Step S150.

If it is other data and necessary to perform any process, this process is executed at Step S160.

At Step S170, the number of bits per pixel and the image size are adjusted.

Figure 25:
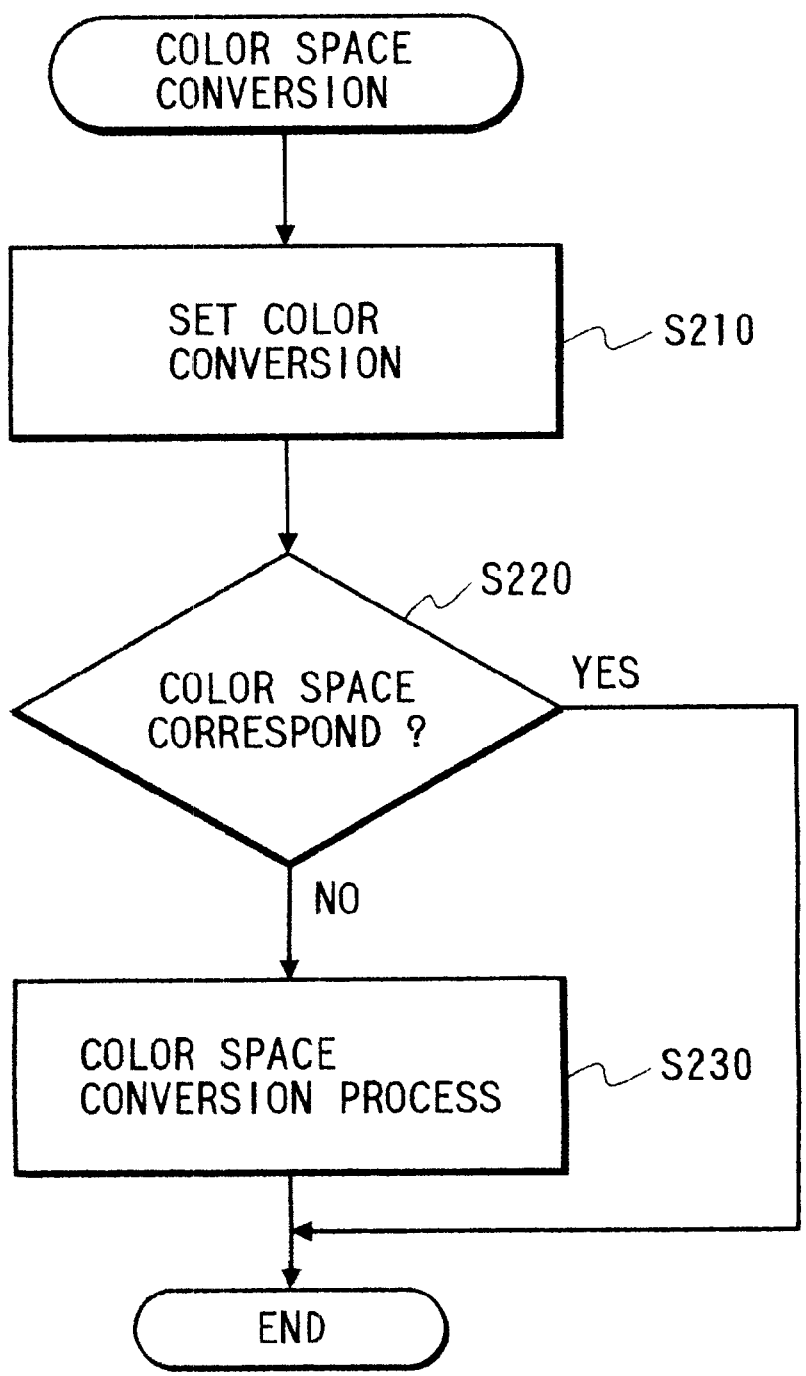
FIG. 25 is a flow chart illustrating a color space conversion procedure.

Next, the color space conversion procedure at Step S20 shown in FIG. 23 will be described with reference to FIG. 25.

At Step S210, a color space is manually set from the operating unit 73.

At Step S220, it is checked whether or not the color space of the input image information is the same as that set at Step S210. If it is different, at Step S230 the color space conversion process is executed.

Figure 26:
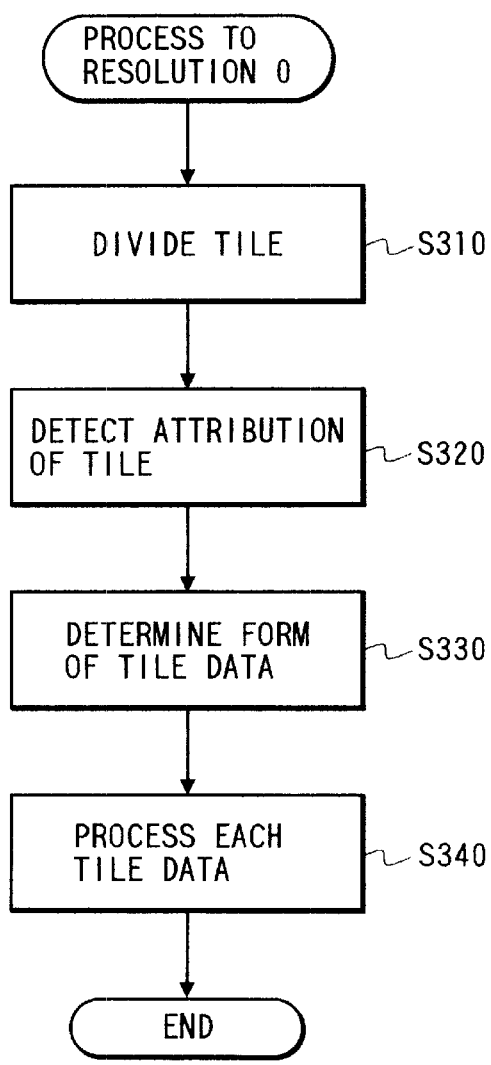
FIG. 26 is a flow chart illustrating a procedure for a resolution 0.

Next, the procedure of processing an image at a resolution 0 at Step S20 shown in FIG. 23 will be described with reference to FIG. 26.

At Step S310, the image is divided into tiles of M×N pixel size.

At Step S320, the attribute of each divided tile is detected. For example, if a tile contains characters, fine lines, or the like, it is determined to be a character/fine line tile, if it contains relatively important information such as human face, it is determined to be an important tile, if it contains the same data of all pixels (or only a small number of pixels have different data values), it is determined to be a single color tile, and for other cases, they are determined to be half-tone tiles.

At Step S330, in accordance with the detected attribute, the data type of each tile is determined. For example, the character/fine line tile and important tile are determined as uncompression of the attribute No. 1, the half-tone tile is determined as JPEG compression of the attribute No. 2, and the single color tile is determined as single color of the attribute No. 3.

At Step S340, image data of each tile is processed so as to meet the determined data type.

The above processes can also be performed basically relative to the formatting process of images at the resolutions 1 to n.

Figure 27:
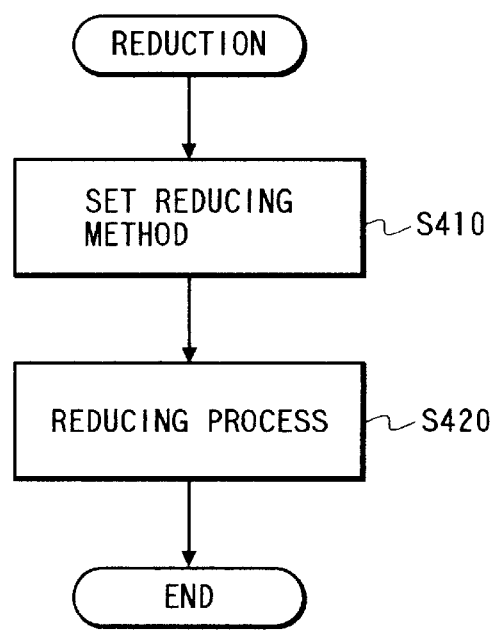
FIG. 27 is a flow chart illustrating a reduction procedure.

Next, the reduction procedure at Step S40 in FIG. 23 will be described with reference to FIG. 27.

At Step S410, a reduction method is manually set from the operating unit 73.

At Step S420, in accordance with the set reduction method, a reduction process is executed relative to the original resolution image data.

The present invention may be applied to a system constituted by a plurality of apparatuses (e.g., a host computer, interface units, a reader, a printer, and the like) or to a system constituted by a single apparatus (e.g., a copier or a fax).

The present invention is not limited to only to the apparatus and method realizing the above embodiments, but the scope of the invention also includes a system or apparatus whose computer (CPU or MPU) runs to operate various devices connected thereto in accordance with software program codes supplied to the system or apparatus so as to realize the functions of the above embodiments.

In this case, the software program codes themselves realize the embodiment functions. Therefore, the program code themselves and means for supplying such program codes to a computer, e.g., a storage medium storing such program codes, constitute the present invention.

The storage medium storing such program codes may be a floppy disk, a hard disk, an optical disk, a magnetooptical disk, a CD-ROM, a magnetic tape, a non-volatile memory card, and a ROM.

Obviously, such program codes are other types of embodiments of this invention, not only for the case wherein the embodiment functions are realized by executing the program codes supplied to the computer but also for the case wherein the embodiment functions are realized by the program codes used with an OS (operating system) on which the computer runs or with other various types of application software.

Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the embodiment functions.

As described so far, the embodiment system is provided with color signal processing means, monochrome signal processing means and JPEG compression means. During the monochrome signal processing, a grey scale JPEG process with all data in a quantization table being set to 1 is executed. Therefore, a JPEG file can be recorded without degrading high resolution data during the monochrome signal processing.

The embodiment system is further provided with two signal processing means including color signal processing means and monochrome signal processing means, RAW data recording means and subimage generating means. If a base image has a JPEG format, the subimage generating means operates with signal processing means of the base image, whereas if the base image is a RAW format, the subimage generating means operates with the two signal processing means. Accordingly, a subimage corresponding to the color/monochrome base image can be generated and recorded irrespective of the type of a record format of the base image such as JPEG and RAW.

According to the embodiments, it is possible to obtain image signals of high quality which is properly compressed in accordance with image processing used. It is possible to obtain color or monochrome image signals by processing input color image signals.

A monochrome image signal of high quality can be easily obtained when an input color image signal is subjected to JPEG compression.

A color subimage signal of a color image signal can be obtained, and a monochrome subimage signal of a monochrome image signal can be obtained.

It is possible to selectively output either a color or monochrome compressed image signal containing a subimage or a color or monochrome RAW image signal containing a subimage, and to record the selected image signal in a recording medium.

What is claimed is:

1. An image processing method comprising:
   an input step of inputting an image signal;
   a selecting step of selecting a precessing method of said image signal input in said input step, said selecting step selecting one of at least a first image processing step of obtaining a color image signal and a second image processing step of obtaining a monochrome image signal; and
   a compressing step of compressing said image signal input in said input step according to the image processing step selected at said selecting step, said compressing step compressing said image signal using a JPEG method and being able to perform compression with a quantization table all data of which are set to one.

2. An image processing method according to claim 1, wherein said compressing step compresses said image signal by setting all the data of the quantization table to one, when the second image reprocessing step is selected in said selecting step.

3. An image processing method according to claim 1, wherein the input image signal is an image signal supplied from image pickup means for picking up a subject image.

4. An image processing method according to claim 3, wherein said image pickup means includes a CCD device with a color filter disposed at each pixel.

5. An image processing method according to claim 1, further comprising a generating step of generating a color subimage signal from the color image signal when said selection step selects said first image processing step, and generating a monochrome subimage signal from the monochrome image signal when said selecting step selects said second image processing step.

6. An image processing method according to claim 5, further comprising the steps of:
   selecting either the input image signal or the image signal compressed by said compressing step; and
   selectively setting either a first mode or a second mode, the first mode outputting the compressed image signal and the subimage signal and the second mode outputting the input image signal and the subimage signal.

7. An image processing method according to claim 6, further comprising the step of recording each image signal output during the first or second mode in a recording medium.

8. An image processing method comprising the steps of:
   preparing a plurality of image processing steps each processing an input image signal, said input image signal being a color image signal;
   selecting one of the plurality of image processing steps, the plurality of image processing steps including a first image processing step for obtaining a color image signal and a second image processing step for obtaining a monochrome image signal;
   compressing an image signal compressed by the image processing step selected at said selecting step;
   controlling a compression factor used at said compressing step in accordance with a selection by said selecting step;
   generating a color subimage signal from the color image signal or a monochrome subimage signal from the monochrome image signal, in accordance with a selection by said selecting step;
   selecting either the input image signal or the image signal compressed by said compressing step; and
   selecting setting either a first mode or a second mode, the first mode outputting the compressed image signal and the subimage signal and the second mode outputting the input image signal and the subimage signal.

9. An image processing method comprising the steps of:
   preparing a plurality of image processing steps each processing an input image signal, said input image signal being a color image signal;
   selecting one of the plurality of image processing steps, the plurality of image processing steps including a first image processing step for obtaining a color image signal and a second image processing step for obtaining a monochrome image signal;
   compressing an image signal compressed by the processing step selected at said selecting step;
   controlling a compression factor used at said compressing step in accordance with a selection by said selecting step;
   generating a color subimage signal from the color image signal or a monochrome subimage signal from the monochrome image signal, in accordance with a selection by selecting step;
   selecting either the input image signal or the compressed by said compressing step; and
   selectively setting either a first or a second mode, the first mode outputting the compressed image signal and the subimage signal and the second mode outputting the input image signal and the subimage signal; and
   recording each image signal output during the first or second mode on a recording medium.

10. An image processing apparatus comprising:
    preparing means for preparing a plurality of image processing steps each processing an input image signal, said input image signal being a color image signal;
    selecting means for selecting one of the plurality image processing steps, the plurality of image processing steps, including a first image processing step for obtaining a color image signal and a second image processing step for obtaining a monochrome image signal;
    compressing means for processed by an image signal processed by the image processing step selected by said selecting means;
    control means for controlling a compression factor used by said compressing means in accordance with a selection by said selecting means;
    generating means for generating a color subimage signal from the color image signal or a monochrome subimage signal from the monochrome image signal, in accordance with a selection by said selecting means;
    means for selecting either the input image signal or the image signal compressed by said compressing means; and setting means selectively setting either a first mode or a second mode, the first mode outputting the compressed image signal and the subimage signal and the second mode outputting the input image signal and the subimage signal.

11. An image processing apparatus comprising:

preparing means for preparing a plurality of image processing steps each processing an input image signal, said input image signal being a color image signal;

selecting means for selecting one of the plurality of image processing steps, the plurality of image processing steps including a first image processing step for obtaining a color image signal and a second image processing step for obtaining a monochrome image signal;

compressing means for compressing an image signal processed by the image processing step selected by said selecting means;

controlling means for controlling a compression or used by said compressing means in accordance with a selection by said selecting means;

generating means for generating a color subimage signal from the color image signal or a monochrome subimage signal from the monochrome image signal, in accordance with a selection by said selecting means;

means for selecting either the input image signal or the image signal compressed by said compressing means;

setting means for selectively setting either a first mode or a second mode, the first mode outputting the compressed image signal and the subimage signal and the second mode outputting the input image signal and the subimage signal; and recording means for recording each image signal output during the first or second mode on a recording medium.

12. An image processing apparatus comprising:

input means for Inputting an image signal;

selecting means for selecting a processing method of said image signal input by said input means, said selecting means for selecting one of at least a first image processing step of obtaining a color image signal and a second image processing step of obtaining a monochrome image signal; and compressing means for compressing said image signal input by said input means according to the image signal input by said input means according to the image processing step selected by said selecting means, said compressing means for compressing said image signal using a JPEG method, wherein said compressing means can perform compression with a quantization table, all data of which are set to one.

13. An apparatus according to claim 12, wherein said compressing means compresses said image signal by setting all the data of the quantization table to one, when the second image processing step is selected by said selecting means.

14. An apparatus according to claim 12, wherein the input image signal is an image signal supplied from image pickup means for picking up a subject image.

15. An apparatus according to claim 14, wherein said pickup means includes a CCD device with a color filter disposed at each pixel.

16. An apparatus according to claim 12, further comprising generating means for generating a color subimage signal from the color image signal when said selecting means selects said first image processing step, and generating a monochrome subimage signal from the monochrome image signal when said selecting means selects said second image processing step.

17. An apparatus according to claim 16, further comprising:

means for selecting either the input image signal or the image signal compressed by said compressing means; and setting means for selectively setting either a first mode or a second mode, the first mode outputting the compressed image signal and the subimage signal and the second mode outputting the input image signal and the subimage signal.

18. An apparatus according to claim 17, further comprising recording means for recording each image signal output during the first or second mode on a recording medium.

* * * * *

UNITED STATES PATENT AND TRADEMARK OFFICE
CERTIFICATE OF CORRECTION

PATENT NO. : 6,426,771 B1
DATED : July 30, 2002
INVENTOR(S) : Masato Kosugi

It is certified that error appears in the above-identified patent and that said Letters Patent is hereby corrected as shown below:

Column 4,
Line 52, "operated" should read -- operates --.

Column 5,
Line 27, "field" should read -- field of --.

Column 6,
Line 1, "to" should be deleted;
Line 21, "the" should read -- a --.

Column 7,
Line 56, "first" should read -- the first --;
Line 60, "the" should read -- a --.

Column 8,
Line 23, "tens" should read -- tens of --.

Column 10,
Line 33, "upper" should read -- the upper --;
Line 58, "zig-zig" should read -- zigzag --.

Column 11,
Line 16, "to." should read -- to --.

Column 12,
Line 41, "as" should read -- as in --.

Column 13,
Line 15, "lower" should read -- the lower --.

Column 15,
Line 38, "later given." should read -- given later. --.

Column 20,
Line 67, "jumped." should read -- skipped. --.

Column 22,
Line 15, "to" (first occurrence) should be deleted.

UNITED STATES PATENT AND TRADEMARK OFFICE
CERTIFICATE OF CORRECTION

PATENT NO. : 6,426,771 B1
DATED : July 30, 2002
INVENTOR(S) : Masato Kosugi

It is certified that error appears in the above-identified patent and that said Letters Patent is hereby corrected as shown below:

Column 23,
Line 17, "precessing" should read -- processing --.

Column 24,
Line 14, "selecting" should read -- selectively --;
Line 36, "by" should read -- by said --;
Line 37, "compressed" should read -- compressed image signal --;
Line 38, "step; and" should read -- step; --;
Line 54, "processed by" should read -- compressing --.

Column 25,
Line 36, "Inputting" should read -- inputting --.

Signed and Sealed this

Fifteenth Day of April, 2003

JAMES E. ROGAN
*Director of the United States Patent and Trademark Office*